US009517833B2

(12) United States Patent
Kent

(10) Patent No.: US 9,517,833 B2
(45) Date of Patent: Dec. 13, 2016

(54) APPARATUSES AND METHODS FOR MANUFACTURING A STRUCTURE

(71) Applicant: The Boeing Company, Chicago, IL (US)

(72) Inventor: Steven R. Kent, Downey, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/698,566

(22) Filed: Apr. 28, 2015

(65) Prior Publication Data
US 2016/0318597 A1 Nov. 3, 2016

(51) Int. Cl.
B64C 1/00 (2006.01)
B64C 3/00 (2006.01)
B64C 5/00 (2006.01)
B64C 3/18 (2006.01)
B64C 3/26 (2006.01)

(52) U.S. Cl.
CPC .......... B64C 3/18 (2013.01); B64C 3/182 (2013.01); B64C 3/185 (2013.01); B64C 3/26 (2013.01)

(58) Field of Classification Search
CPC .......... B64C 3/18; B64C 3/182; B64C 3/185; B64C 3/187; B64C 3/20; B64C 3/22; B64C 3/24; B64C 3/26

USPC .......... 244/123.1, 123.3, 123.4, 123.8, 124
See application file for complete search history.

(56) References Cited

U.S. PATENT DOCUMENTS

| 1,796,654 | A | * | 3/1931 | Hermann | B64C 3/00 244/123.1 |
| 2,240,310 | A | | 4/1941 | McKay | |
| 3,002,717 | A | * | 10/1961 | Pavlecka | B64C 3/26 244/124 |
| 3,185,267 | A | * | 5/1965 | Pavlecka | E04C 2/40 244/123.1 |
| 2013/0075529 | A1 | * | 3/2013 | Marcoe | B32B 1/08 244/131 |
| 2013/0243992 | A1 | * | 9/2013 | Tanaka | B64C 3/182 428/58 |

* cited by examiner

Primary Examiner — Richard G Davis
(74) Attorney, Agent, or Firm — Walters & Wasylyna LLC

(57) ABSTRACT

A structure (100) comprises a first panel (102); first stringers (106), coupled to the first panel (102) and comprising stringer pairs A; a second panel (104) opposite the first panel (102); and second stringers (108), coupled to the second panel (104) and opposite the first stringers (106). The second stringers (108) comprise stringer pairs B. The structure (100) also comprises braces (200). Each of the braces (200) is geometrically interlocked with one of the stringer pairs A of the first stringers (106) and one of the stringer pairs B of the second stringers (108) in all directions along a plane (112) perpendicular to the first stringers (106) and the second stringers (108).

20 Claims, 18 Drawing Sheets

APPARATUSES AND METHODS FOR MANUFACTURING A STRUCTURE

BACKGROUND

Some structures may utilize numerous support members for bearing loads and/or reacting thereto. The support members may form internal frames of such structures. Support members may include, for example, various types of beams, stiffeners, struts and/or braces. Paneling may be coupled to the support members to cover the frames of the structures. Conventional manufacturing techniques of such structures require the use of a large number of mechanical fasteners, increasing manufacturing complexity, lead-time, and cost.

As one particular example, a wing structure of an aircraft typically utilizes numerous elongated stiffeners (commonly referred to as stringers), extending the length of the wing, and braces (commonly referred to as ribs), interconnecting the stringers, which in combination at least partially define the frame of the wing. Exterior panels (commonly referred to as skins) are connected to the frame. Wing structures may require thousands of close-tolerance fasteners to connect the ribs to the stringers and the skins to the stringers and/or the ribs.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a structure comprising a first panel; first stringers coupled to the first panel and comprising stringer pairs A; a second panel opposite the first panel; and second stringers, coupled to the second panel and opposite the first stringers. The second stringers comprise stringer pairs B. The structure also comprises braces. Each of the braces is geometrically interlocked with one of the stringer pairs A of the first stringers and one of the stringer pairs B of the second stringers in all directions along a plane perpendicular to the first stringers and the second stringers.

Another example of the present disclosure relates to a brace for geometrically interlocking stringer pairs A of first stringers, coupled to a first panel, and stringer pairs B of second stringers, coupled to a second panel, of a structure. The brace comprises a chassis comprising first interlocks and second interlocks opposite the first interlocks. The first interlocks geometrically engage with one of the stringer pairs A of the first stringers and the second interlocks geometrically engage with one of the stringer pairs B of the second stringers to constrain the brace in all directions along a plane perpendicular to the first stringers and the second stringers.

Yet another example of the present disclosure relates to a method for manufacturing a structure comprising a first panel and a second panel. The method comprises interconnecting the first panel and the second panel by geometrically interlocking stringer pairs A of first stringers, coupled to the first panel, with stringer pairs B of second stringers, coupled to the second panel, in all directions along a plane perpendicular to the first stringers and the second stringers.

BRIEF DESCRIPTION OF THE DRAWINGS

Figure 1:
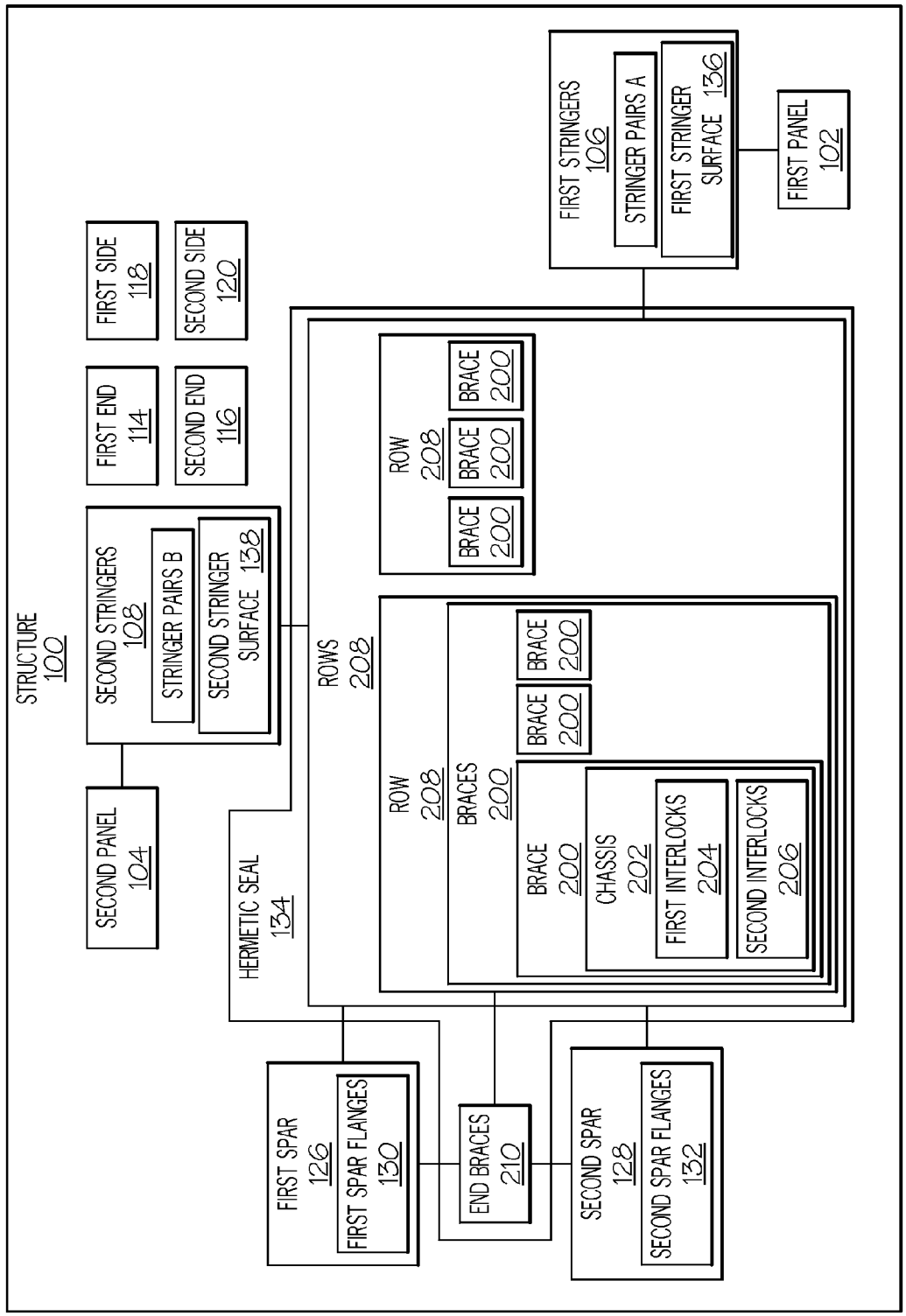
Figure 2:
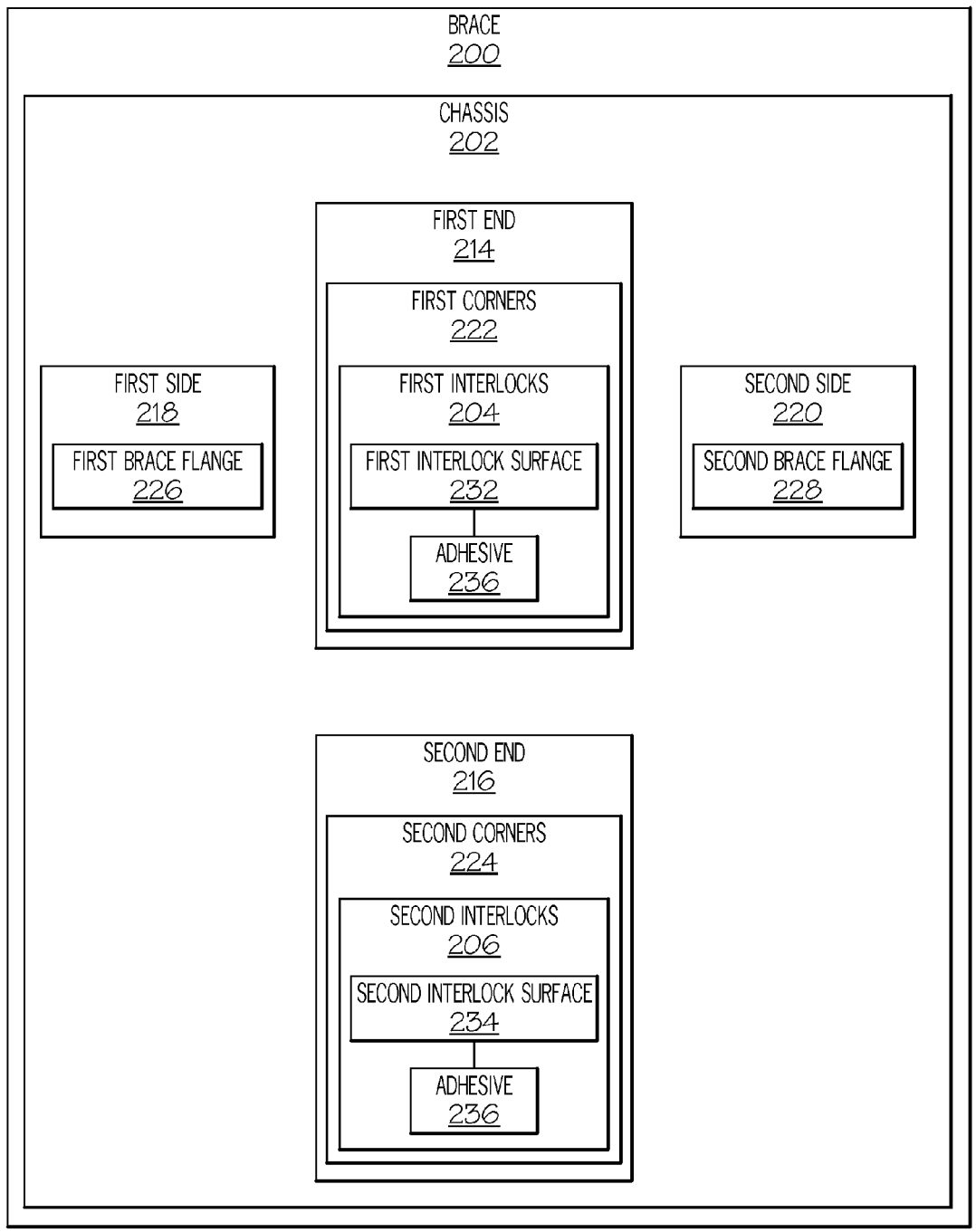
Figure 3:
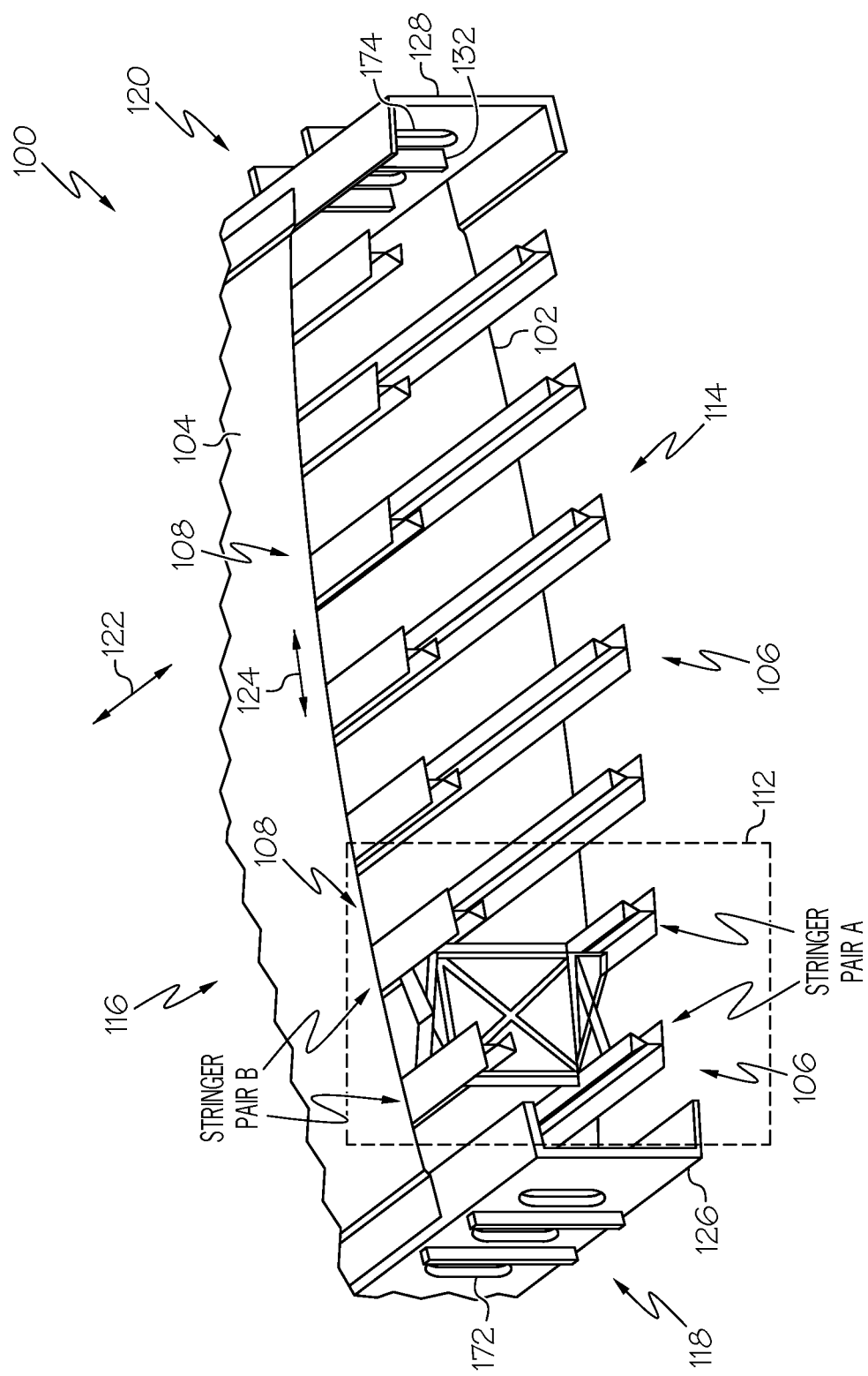
Figure 4:
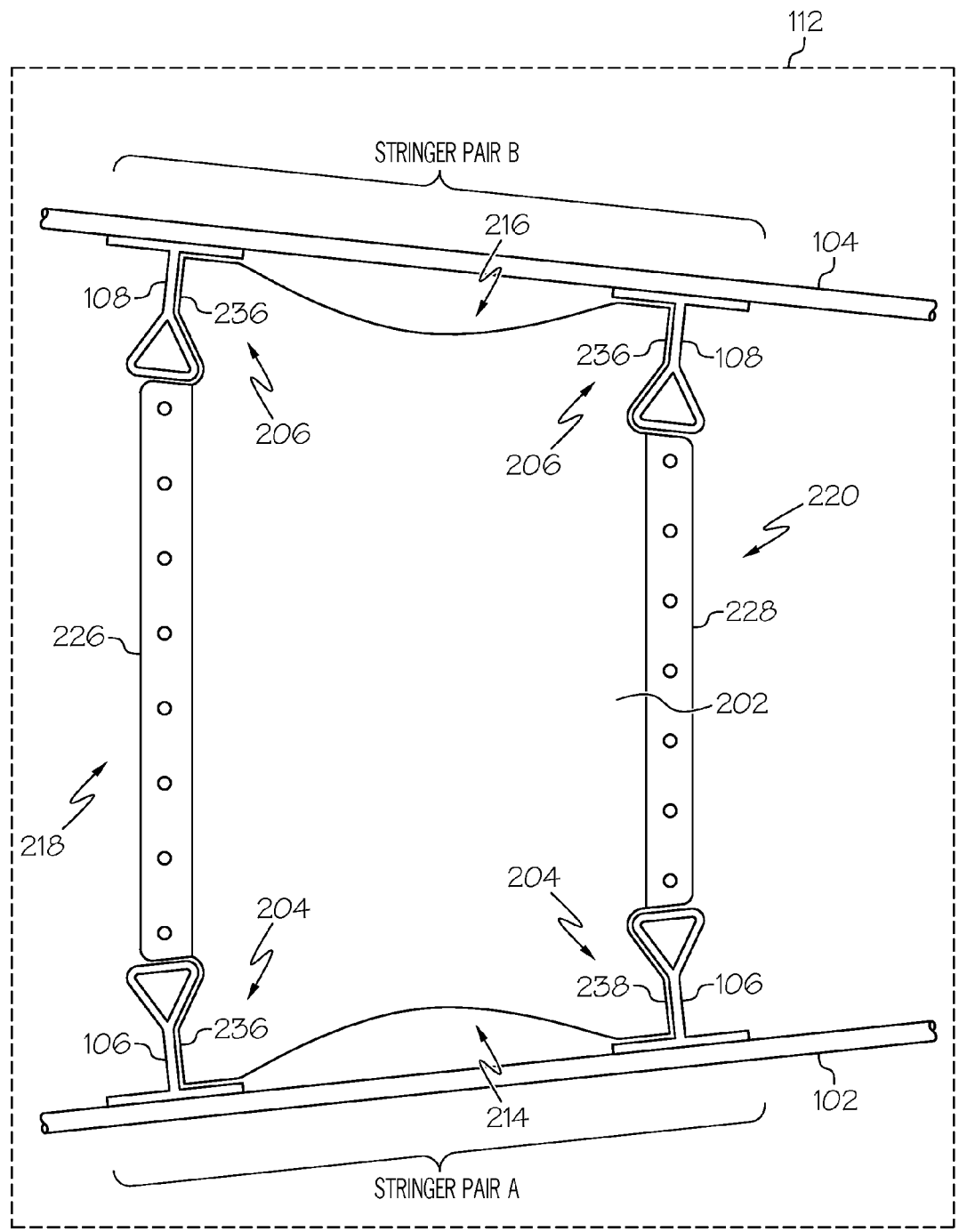
Figure 5:
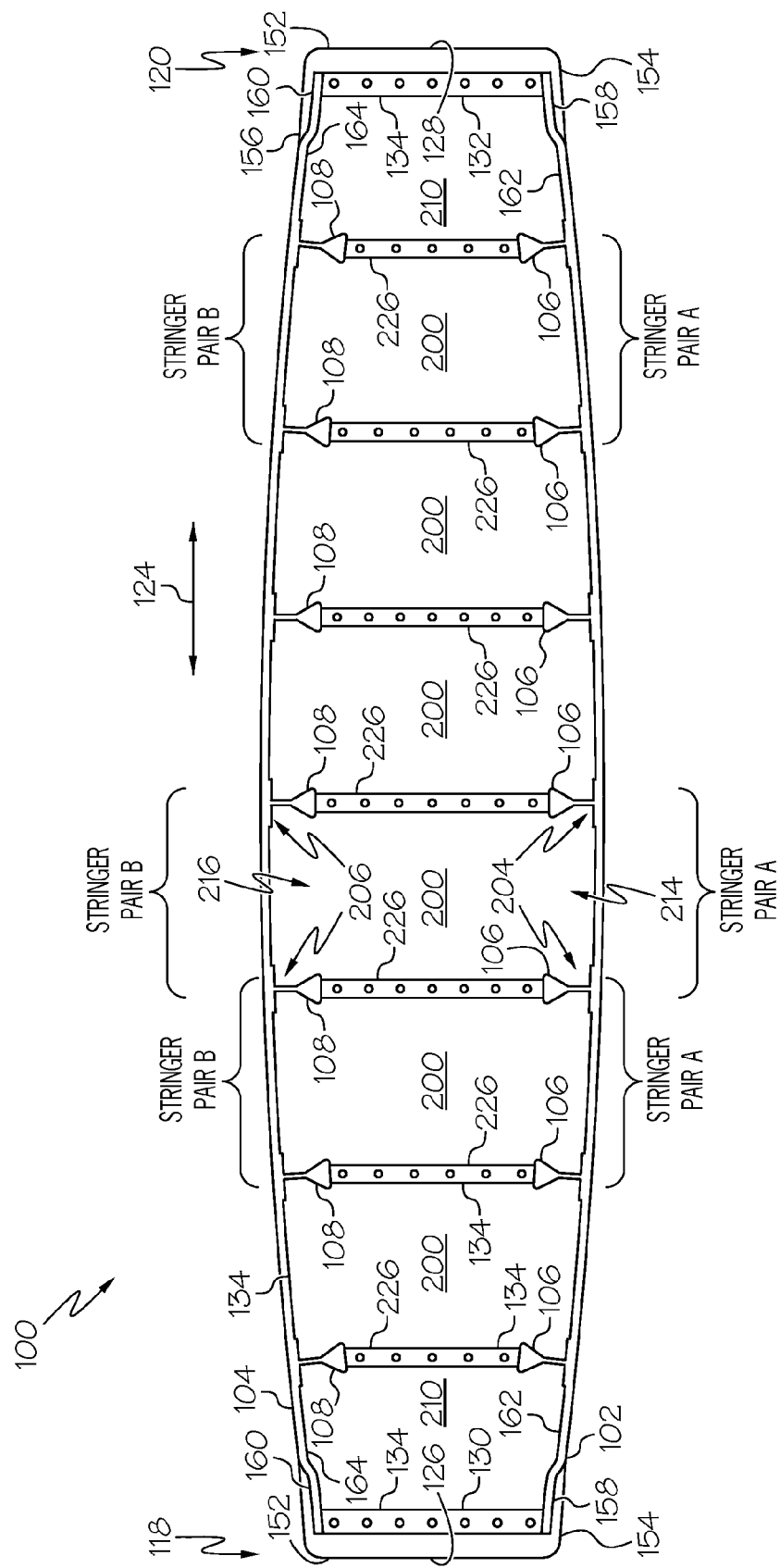
Figure 6:
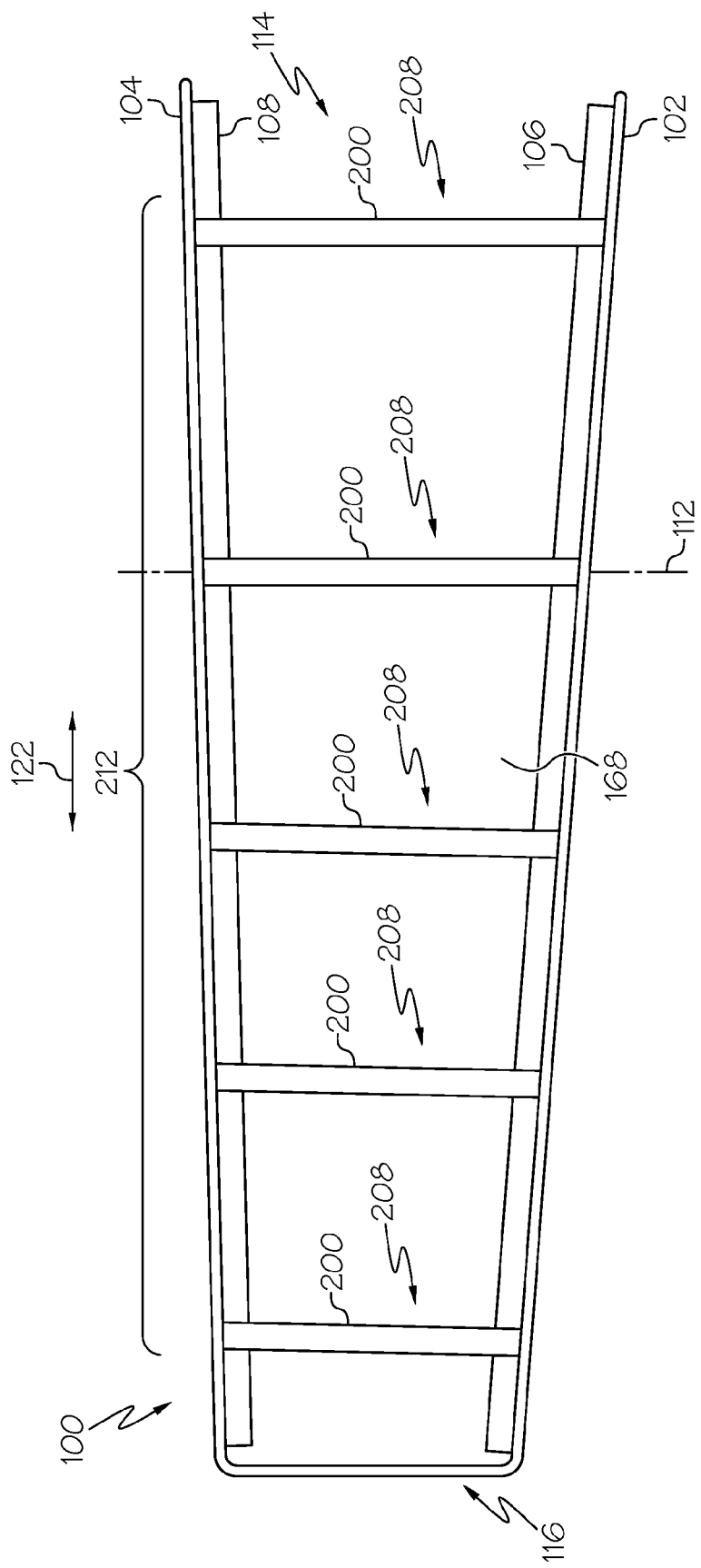
Figure 7:
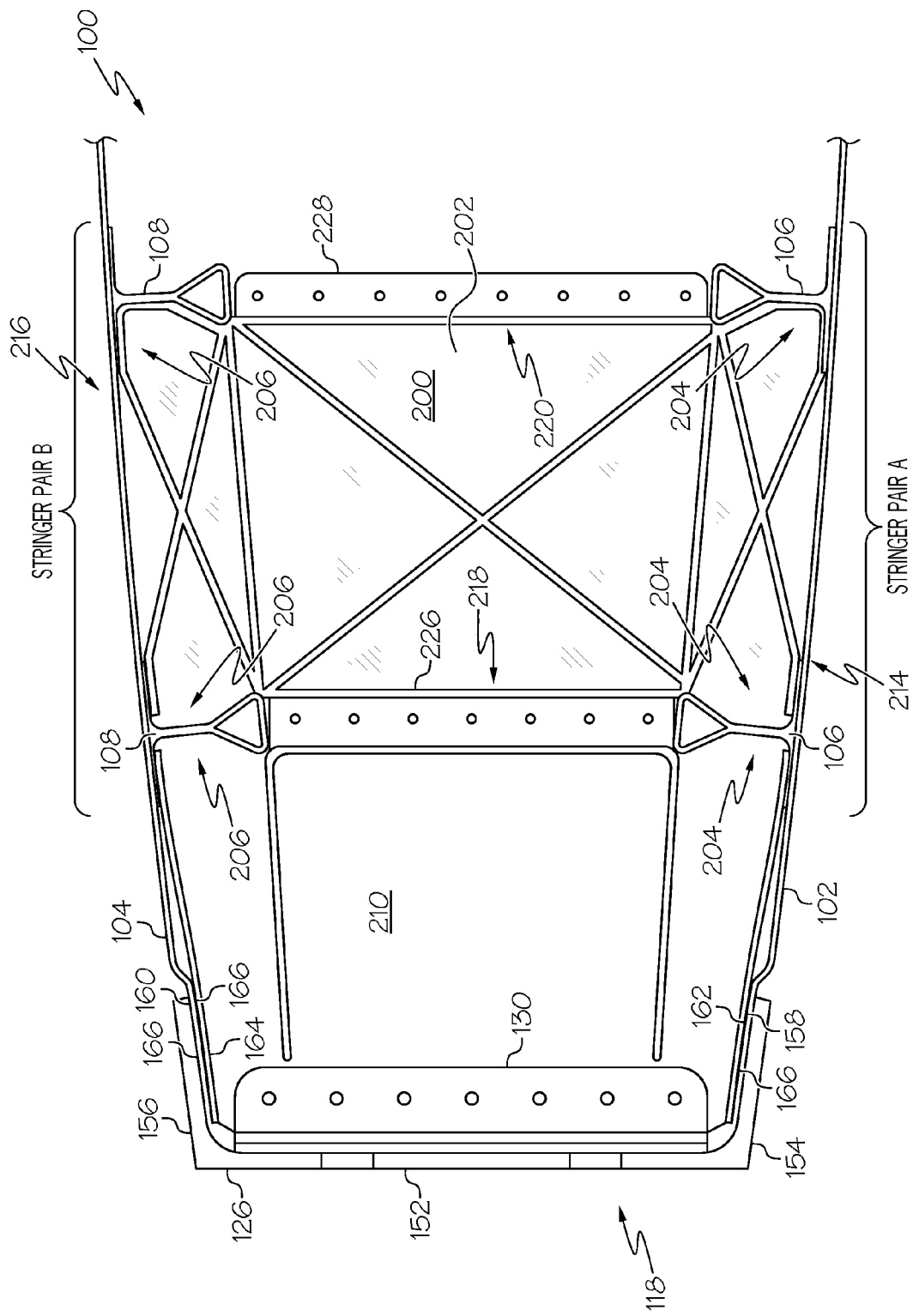
Figure 8:
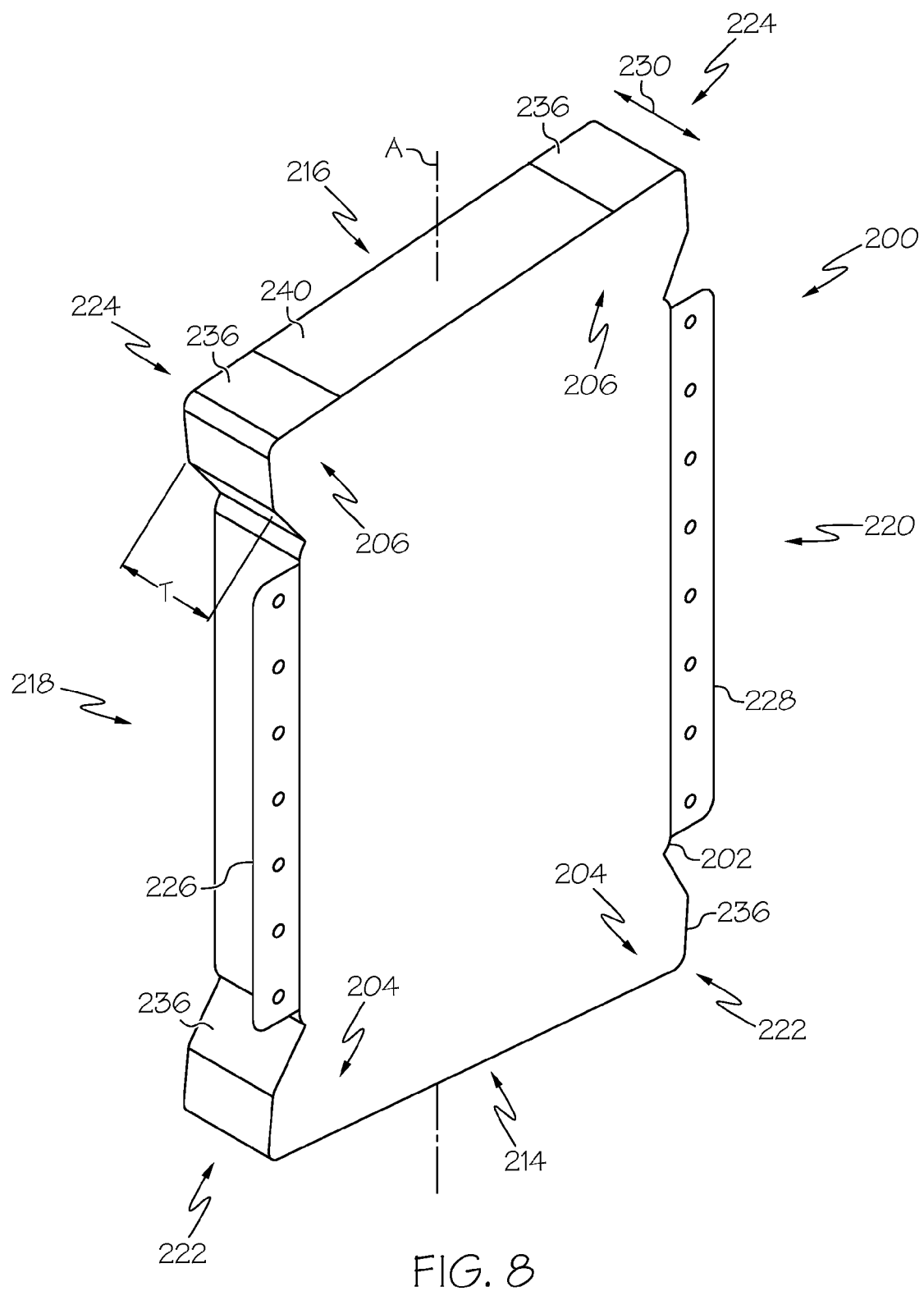
Figure 9:
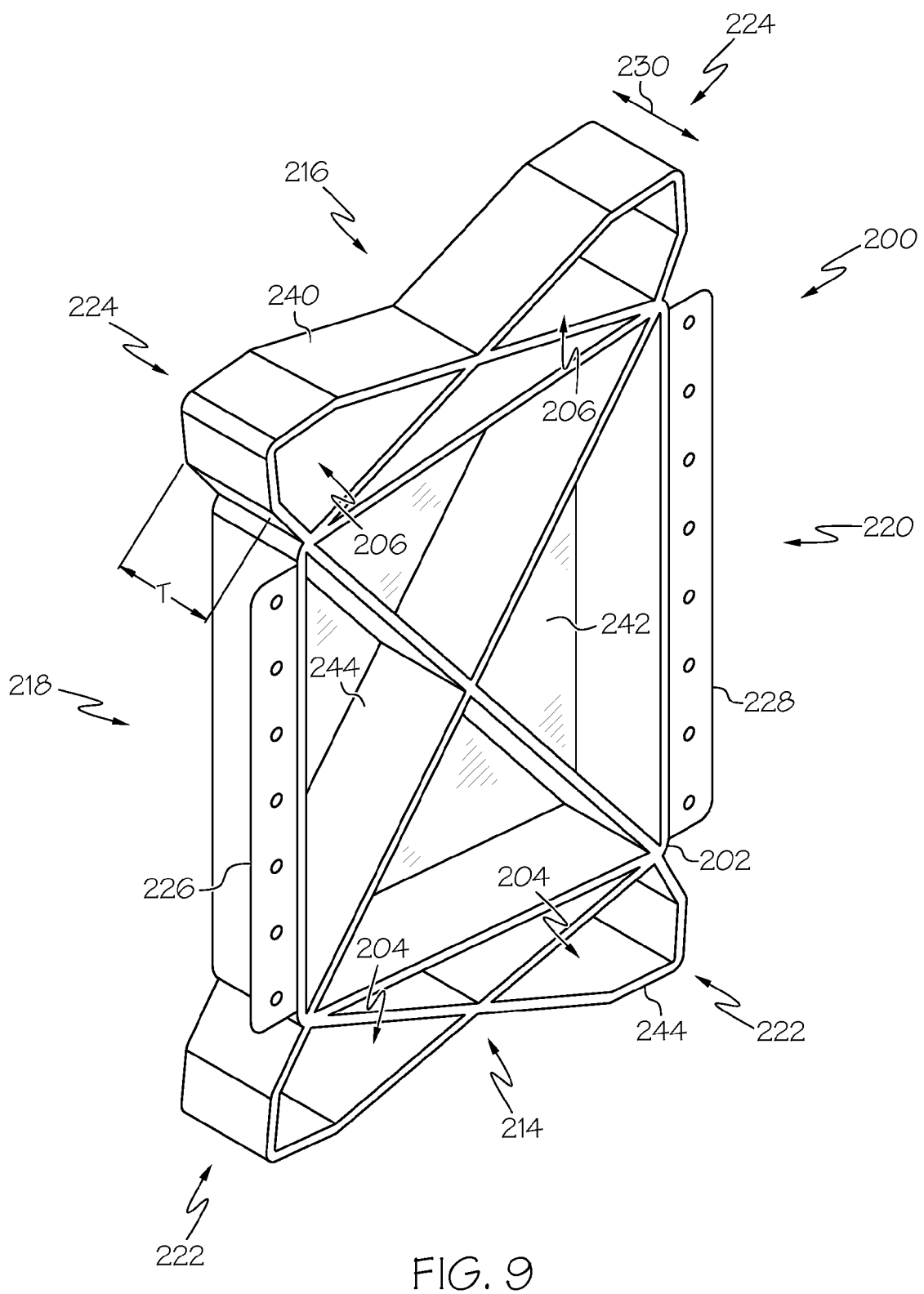
Figure 10:
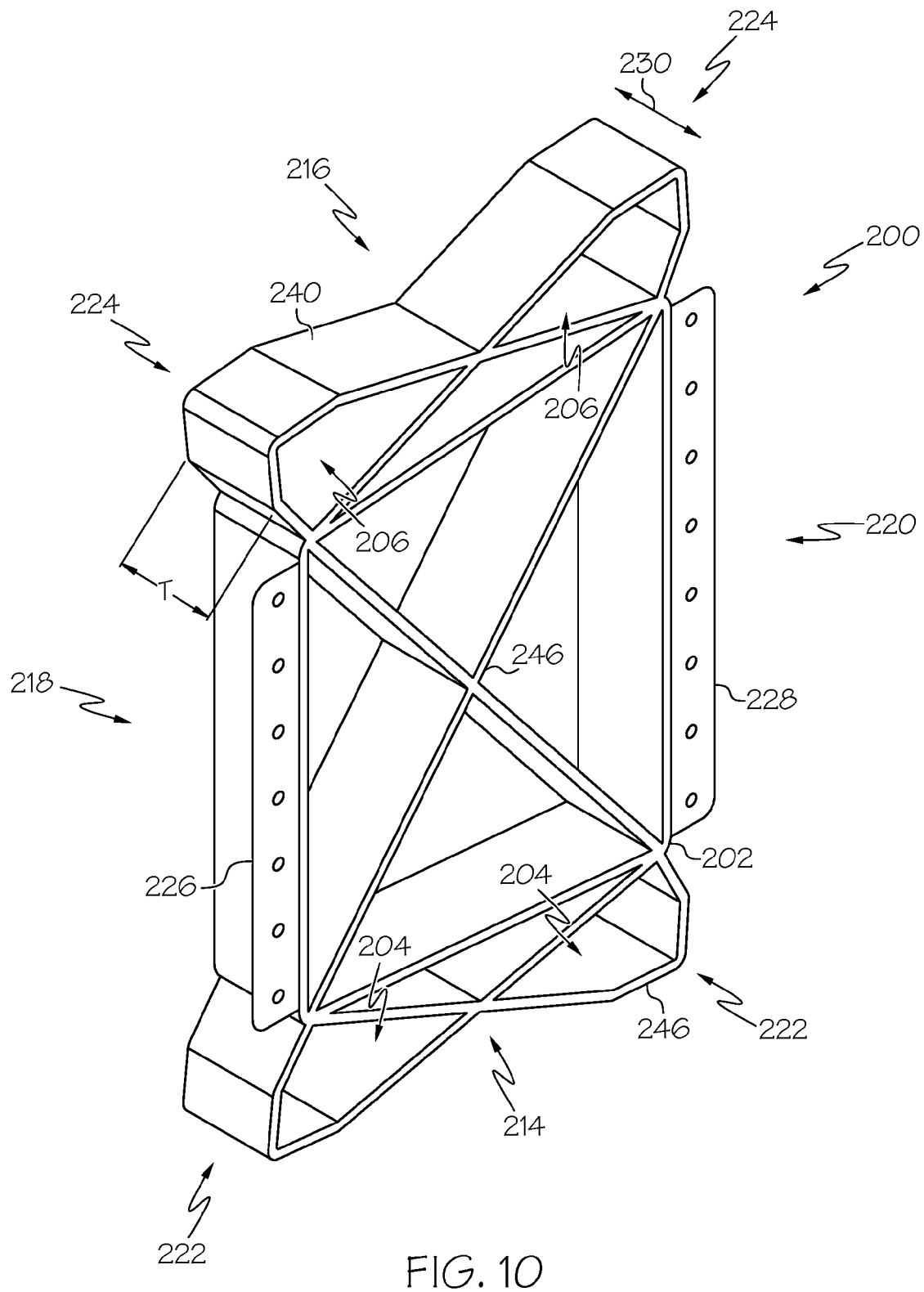
Figure 11:
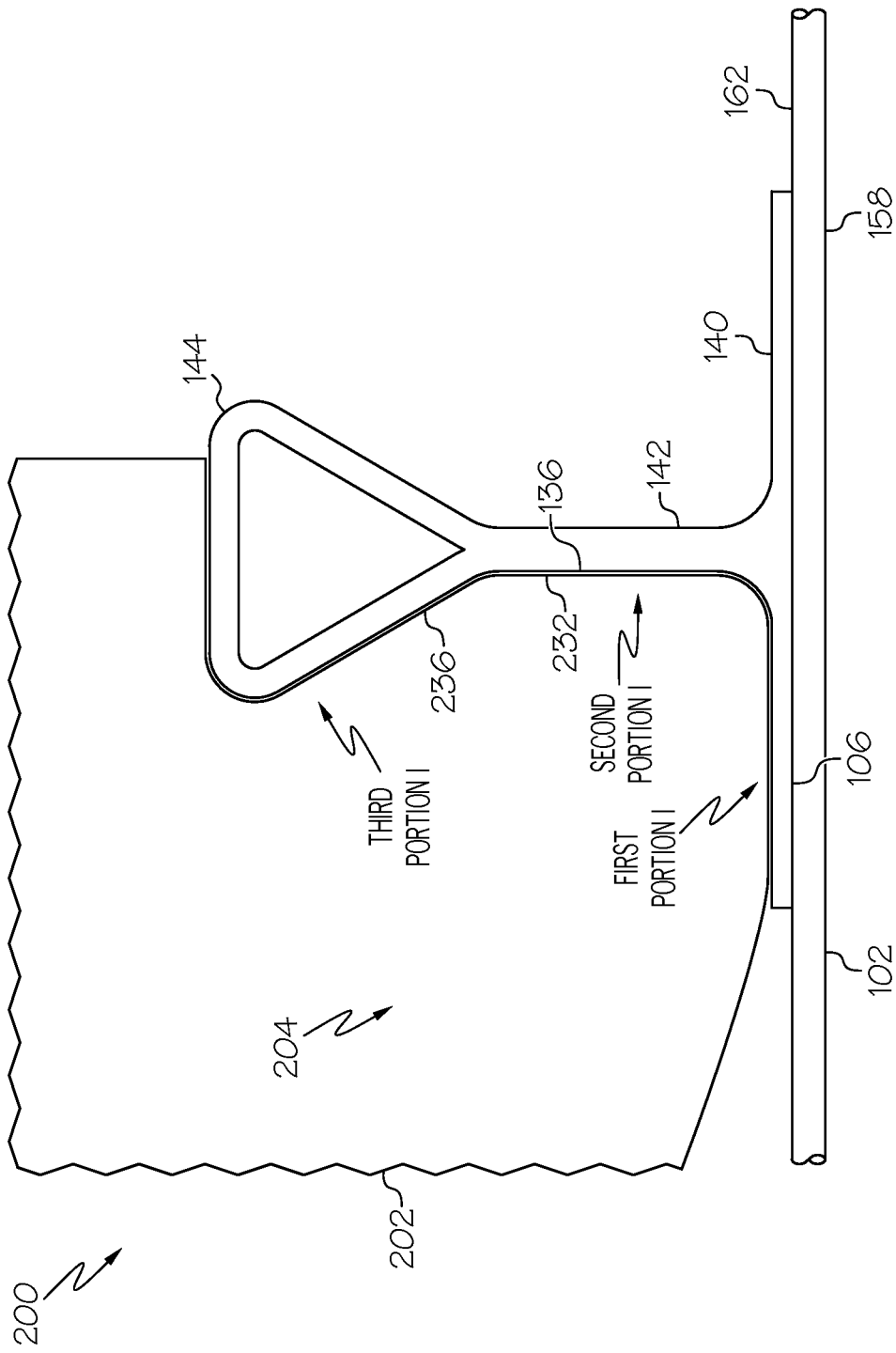
Figure 12:
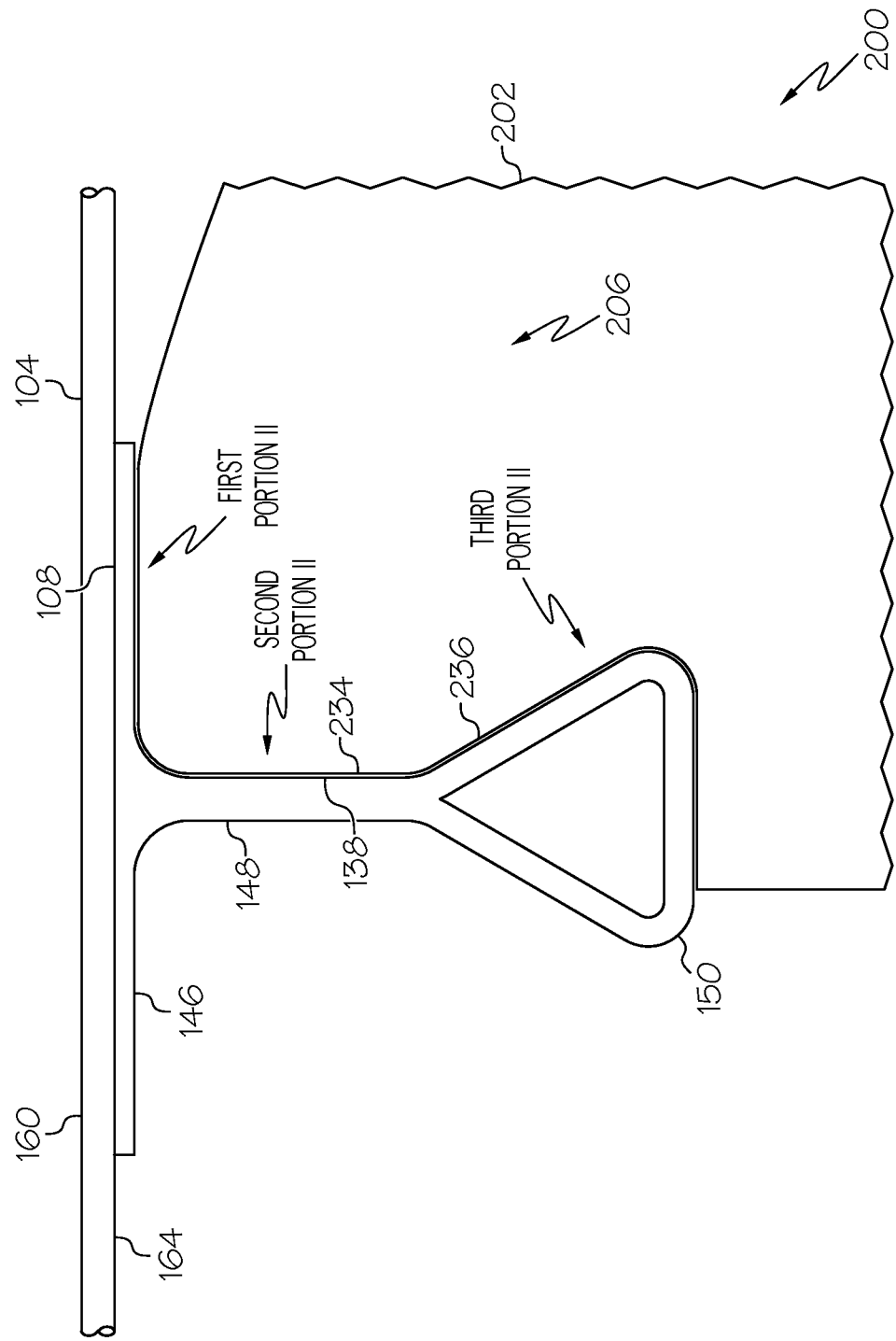
Figure 13A:
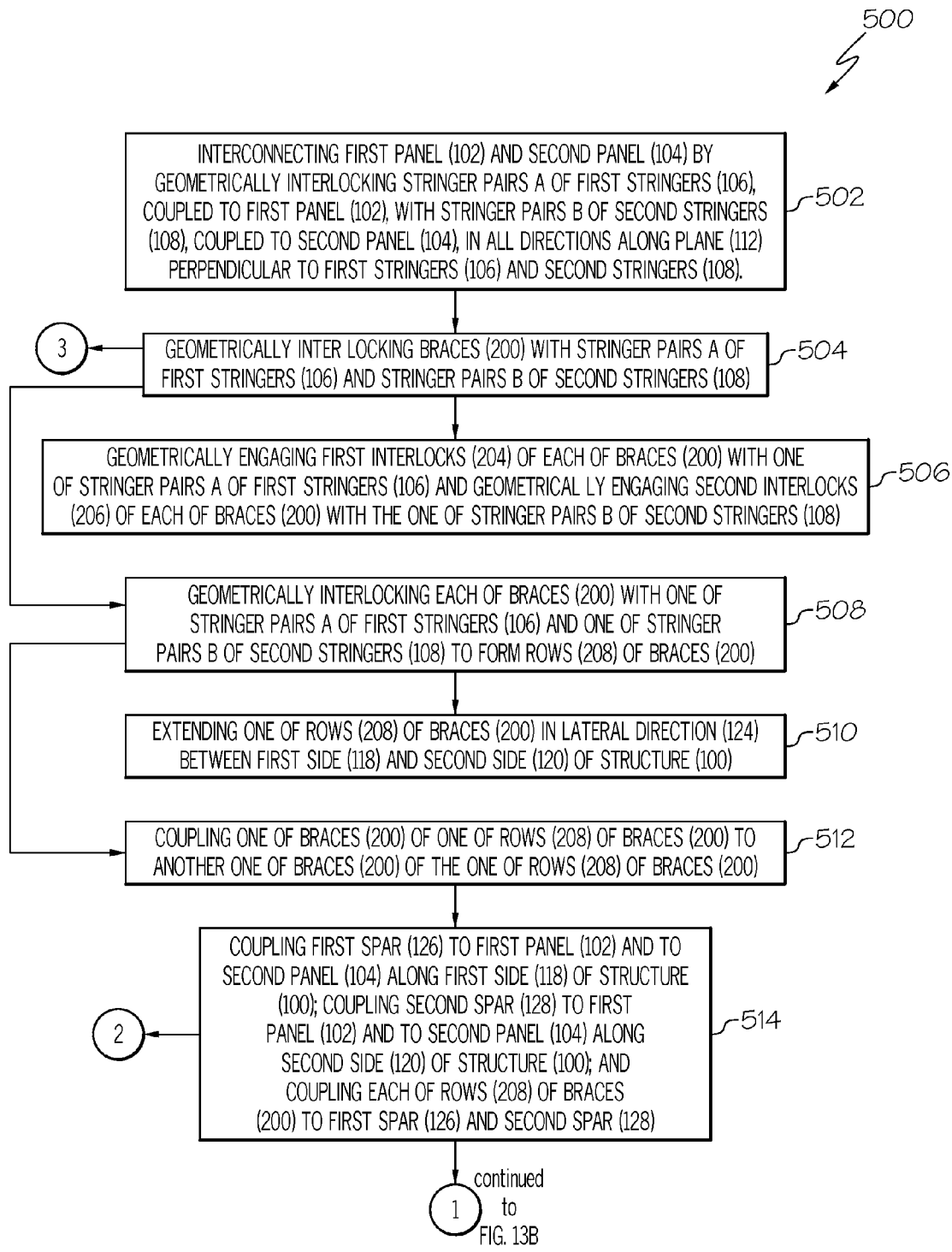
Figure 13B:
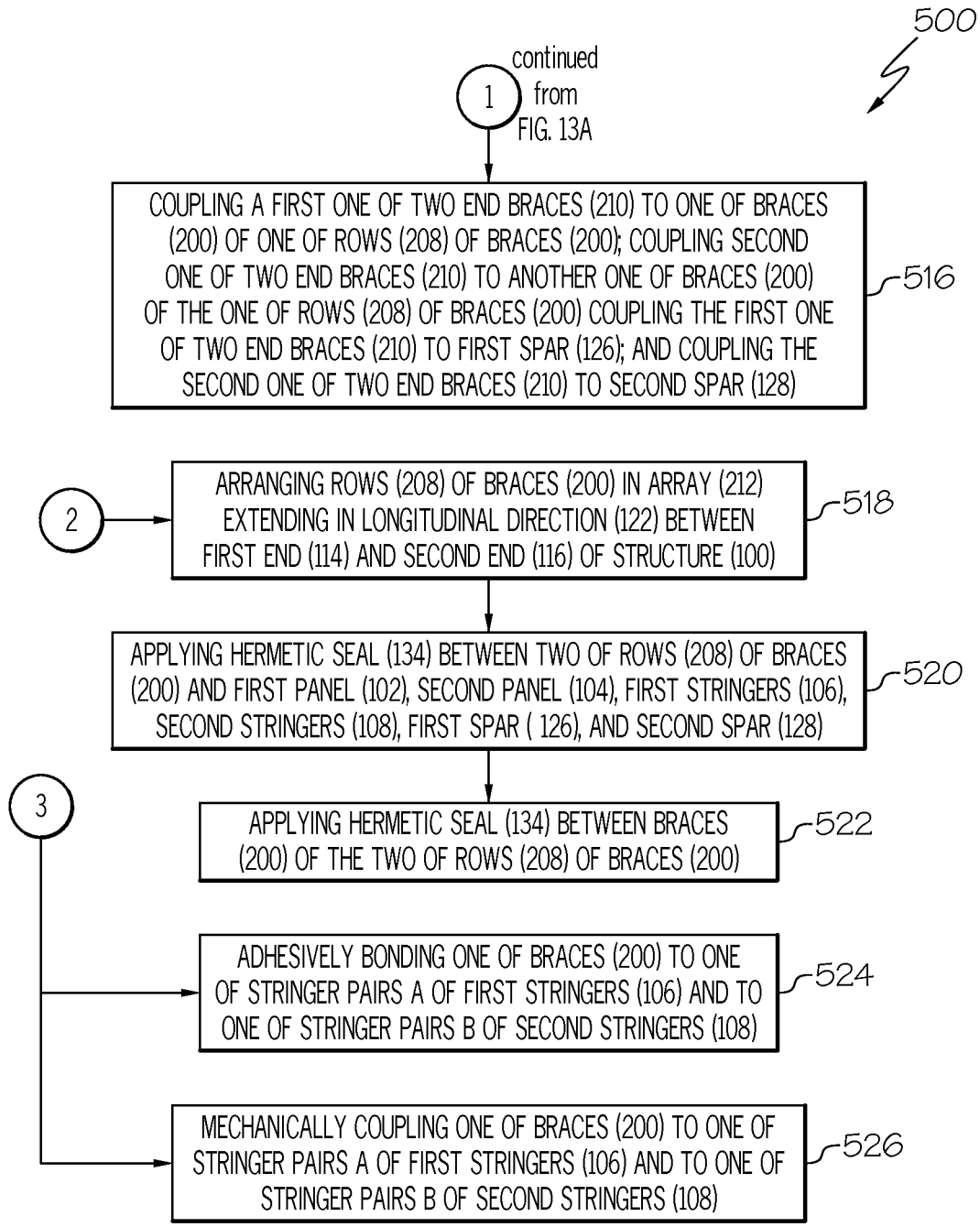
Figure 14:
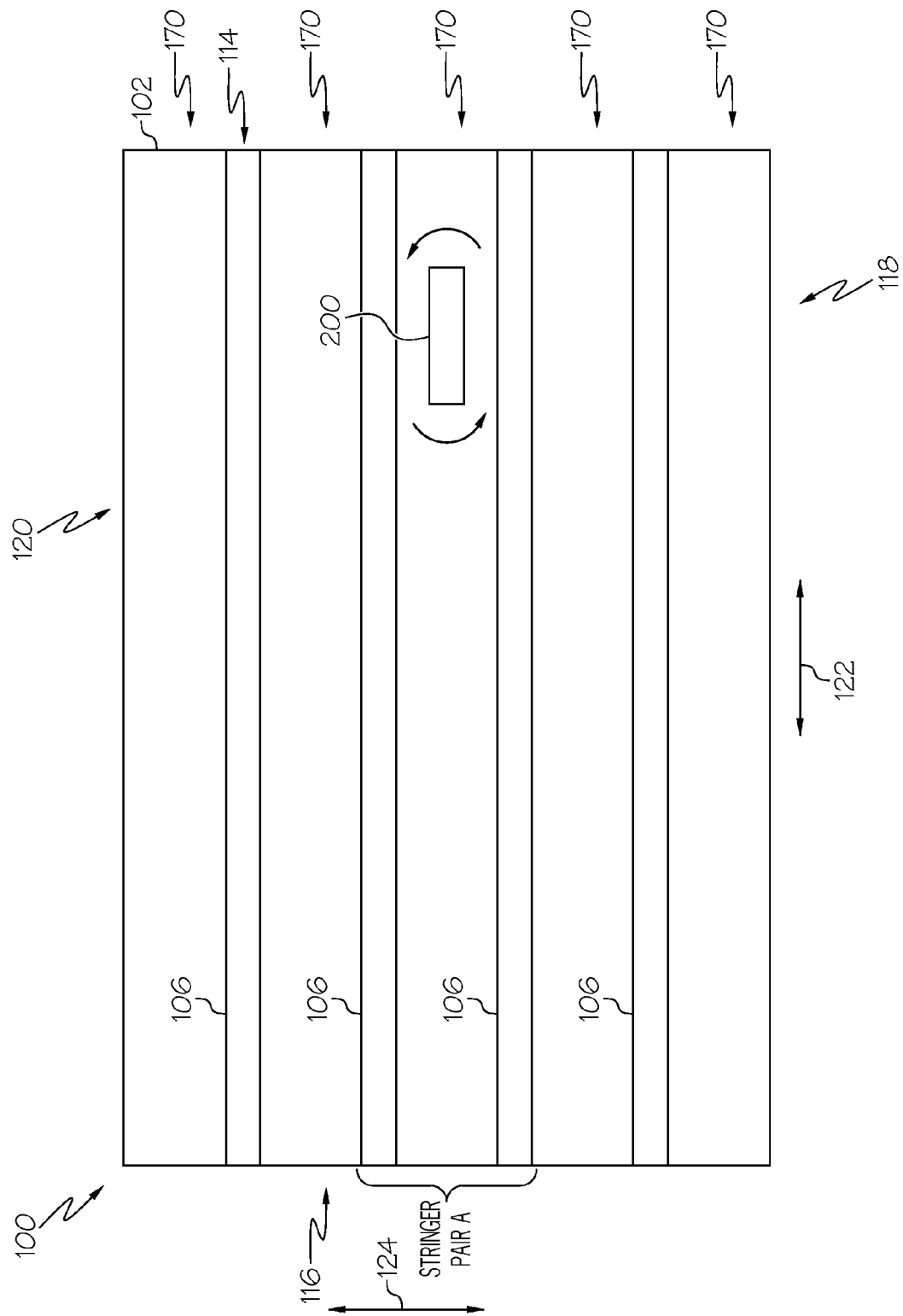
Figure 15:
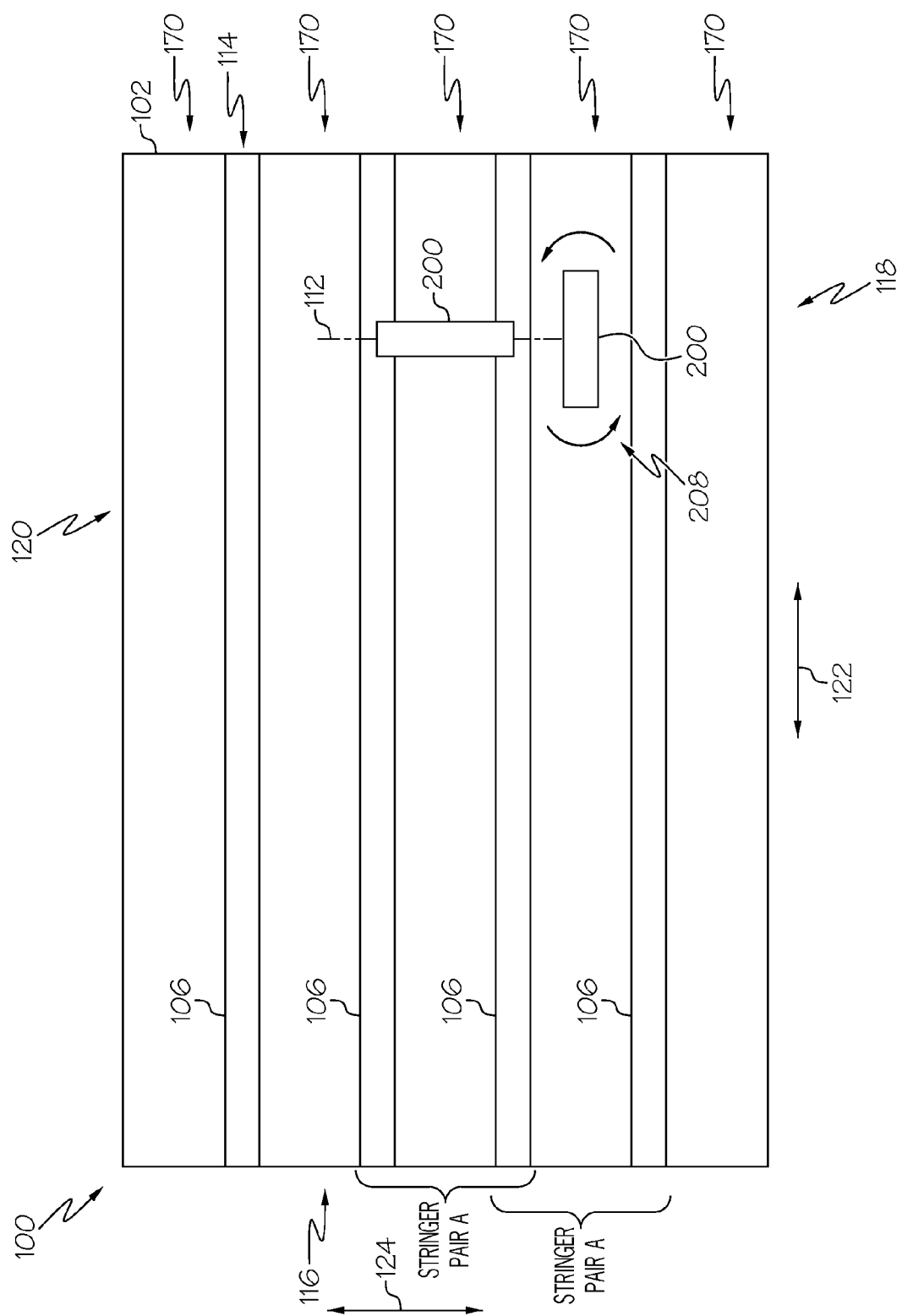
Figure 16:
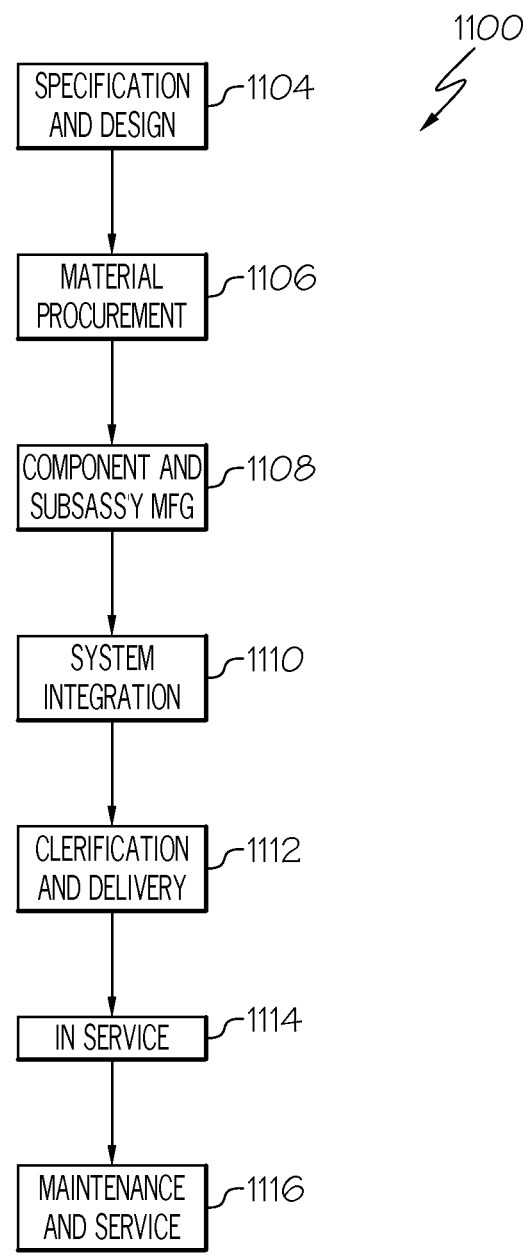

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a structure, according to one or more examples of the present disclosure;

FIG. 2 is a block diagram of a brace of the structure of FIG. 1, according to one or more examples of the present disclosure;

FIG. 3 is a schematic perspective cutaway view of a portion of the structure of FIG. 1, according to one or more examples of the present disclosure;

FIG. 4 is a schematic partial cross-sectional view of the structure of FIG. 1, according to one or more examples of the present disclosure;

FIG. 5 is a schematic cross-sectional view of the structure of FIG. 1, according to one or more examples of the present disclosure;

FIG. 6 is a schematic longitudinal-section view of the structure of FIG. 1, according to one or more examples of the present disclosure;

FIG. 7 is a schematic partial cross-sectional view of the structure of FIG. 1, according to one or more examples of the present disclosure;

FIG. 8 is a schematic perspective view of the brace of FIG. 2, according to one or more examples of the present disclosure;

FIG. 9 is a schematic perspective view of the brace of FIG. 2, according to one or more examples of the present disclosure;

FIG. 10 is a schematic perspective view of the brace of FIG. 2, according to one or more examples of the present disclosure;

FIG. 11 is a schematic partial side elevation view of one of the first stringers and the brace of the structure of FIG. 1, according to one or more examples of the present disclosure;

FIG. 12 is a schematic partial side elevation view of one of the second stringers and the brace of the structure of FIG. 1, according to one or more examples of the present disclosure;

FIG. 13A is a first portion of a block diagram of a method for manufacturing the structure of FIG. 1, according to one or more examples of the present disclosure;

FIG. 13B is a second portion of a block diagram of the method for manufacturing the structure of FIG. 1, according to one or more examples of the present disclosure;

FIG. 14 is a schematic illustration of one brace being geometrically interlocked with a stringer pair A of first stringers and a stringer pair B of second stringers of the structure of FIG. 1, according to one or more examples of the present disclosure;

FIG. 15 is a schematic illustration of another brace being geometrically interlocked with another stringer pair A of first stringers and another stringer pair B of second stringers of the structure of FIG. 1, according to one or more examples of the present disclosure;

FIG. 16 is a block diagram of aircraft production and service methodology; and

Figure 17:
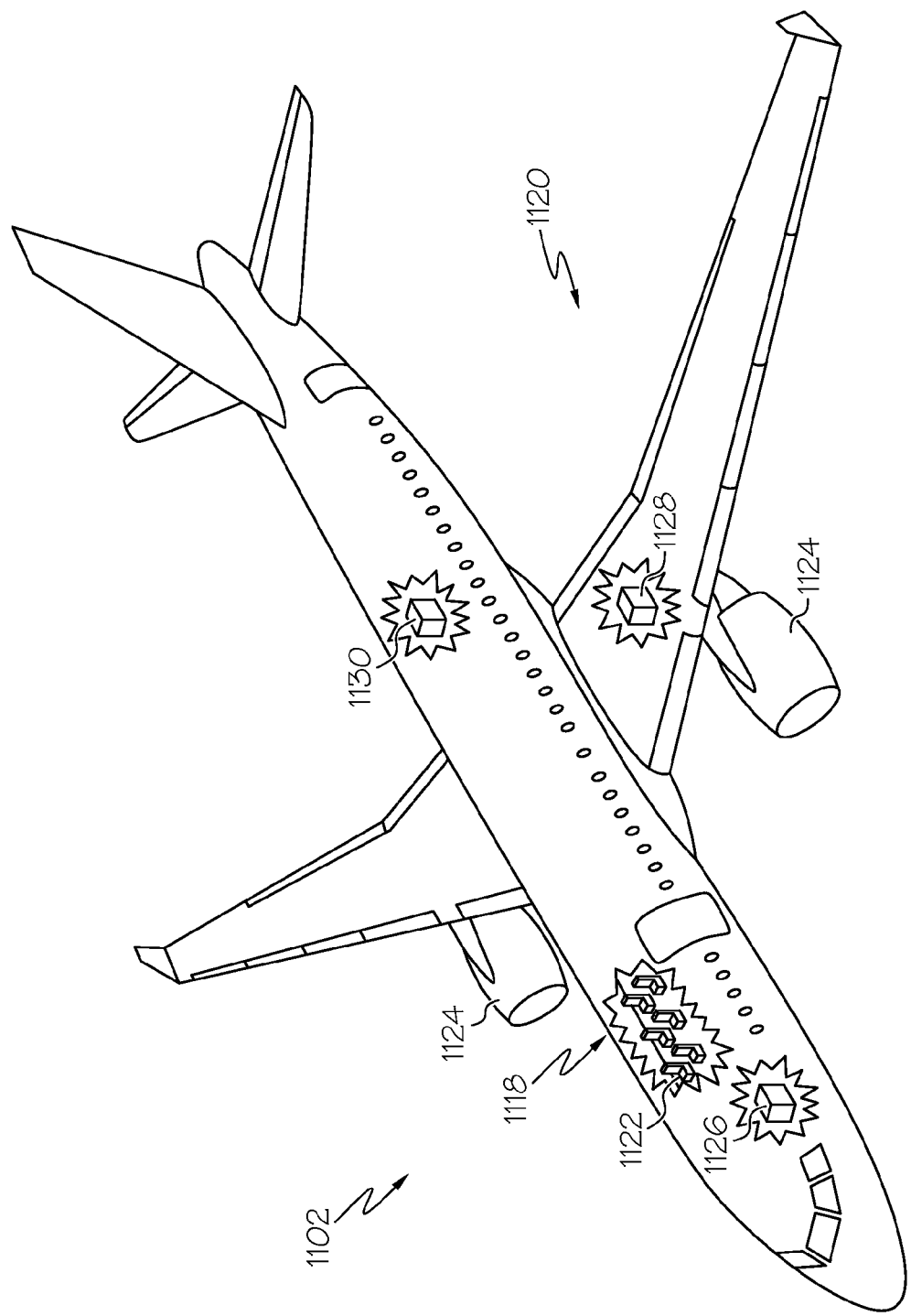

FIG. 17 is a schematic illustration of an aircraft.

DETAILED DESCRIPTION

In FIGS. 1 and 2, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIGS. 1 and 2 may be combined in various ways without the need to include other features described in FIGS. 1 and 2, other drawing figures, and/or the accompanying disclosure, even though such combination or combinations are not explicitly illustrated herein. Similarly, additional features not limited to the examples presented, may be combined with some or all of the features shown and described herein.

In FIGS. 13 and 16, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13 and 16 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring, e.g., to FIGS. 1-4, structure 100 is disclosed. Structure 100 comprises first panel 102. Structure 100 further comprises first stringers 106, coupled to first panel 102 and comprising stringer pairs A. Additionally, structure 100 comprises second panel 104, opposite first panel 102, and second stringers 108, coupled to second panel 104 and opposite first stringers 106. Second stringers 108 comprise stringer pairs B. Structure 100 also comprises braces 200. Each of braces 200 is geometrically interlocked with one of stringer pairs A of first stringers 106 and one of stringer pairs B of second stringers 108 in all directions along plane 112 perpendicular to first stringers 106 and second stringers 108. The preceding subject matter of this paragraph characterizes example 1 of the present disclosure.

Geometrically interlocking stringer pairs A of first stringers 106 and stringer pairs B of second stringers with braces 200 significantly reduces, if not eliminates, the need to mechanically fasten braces 200 to first stringers 106 and/or second stringers 108 and/or braces 200 to first panel 102 and/or second panel 104 and, thus, significantly reduces the time, expense, complexity and/or difficulty in manufacturing (e.g., assembly of) structure 100.

As one example, structure 100 is a wing of an aircraft, for example, aircraft 1102 illustrated FIG. 15. First panel 102 and second panel 104 are skin panels. First stringers 106 and second stringers 108 are elongated stiffeners of the wing. First stringers 106 and second stringers 108 transfer loads acting on first panel 102 and/or second panel 104, for example, aerodynamic loads onto an airframe of the aircraft. Braces 200 are ribs of the wing. Braces 200 interconnect first panel 102 and second panel 104, for example, via mechanically interlocking stringer pairs A of first stringers 106 and stringer pairs B of second stringers 108. Braces 200 transfer shear compression forces and/or pull-off load forces acting one first panel 102 and/or second panel 104. For example, braces 200 transfer shear compression forces and/or pull-off load forces without the need for fasteners directly coupling braces 200 to first panel 102 and/or second panel 104, for example, fasteners disposed through first panel 102 and/or second panel 104 and fastened to braces 200.

As one example, braces 200 appropriately position first panel 102 relative to second panel 104. For example, braces 200 maintain (e.g., incorporate or define) the shape of structure 100. For instance, braces 200 maintain the shape of the wing. As one example, braces 200 define a thickness of structure 100, for example, a thickness of the wing of the aircraft. As one example, structure 100 (e.g., the wing) is a symmetrical (e.g., structure 100 includes a constant thickness in one or both of longitudinal direction 124 and/or lateral direction 124). As one example, the wing includes a box shape. As one example, structure 100 (e.g., the wing) is asymmetrical (e.g., structure 100 includes a varying thickness in one or both of longitudinal direction 124 and/or lateral direction 124). As one example, the wing includes an airfoil shape. Other shapes of the wing (e.g., of structure 100) are also contemplated.

As one example, and as best illustrated in FIGS. 3 and 6, first stringers 106 extend in a spanwise direction of the wing. Second stringers 108 extend in the spanwise direction of the wing. Each one of first stringers 106, for example, of stringer pairs A, is spaced apart from another one of first stringers 106, for example, of stringer pairs A, in a chordwise direction of the wing. Each one of second stringers 108, for example, of stringer pairs B, is spaced apart from another one of second stringers 108, for example, of stringer pairs B, in the chordwise direction of the wing.

As one example, and as best illustrated in FIGS. 3-5, each one of first stringers 106, for example, of stringer pairs A, and each one of second stringers 108, for example, of stringer pairs B, are directly opposite to one another, for example, in the chordwise direction. As one example (not explicitly illustrated), each one of first stringers 106, for example, of stringer pairs A, and each one of second stringers 108, for example, of stringer pairs B, are slightly offset from one another, for example, in the chordwise direction.

As illustrated in FIG. 5, as one example, different ones of stringer pairs A share a common one of first stringers 106. Similarly, different ones of stringer pairs B share a common one of second stringers 108. As one example, different ones of stringer pairs A do not share a common one of first stringers 106 and/or different ones of stringer pairs B do not share a common one of second stringers 108.

As one example, each of first panel 102 and/or second panel 104 is formed of a metal material. As one example, each of first panel 102 and/or second panel 104 is formed of a composite material. As one example, at least one of first panel 102 and/or second panel 104 is formed of one of a metal material or a composite material. Other materials and/or combination of material are also contemplated.

As one example, each of first stringers 106 and/or second stringers 108 is formed of a metal material. As one example, each of first stringers 106 and/or second stringers 108 is formed of a composite material. As one example, at least one of first stringers 106 and/or second stringers 108 is formed of one of a metal material or a composite material. Other materials and/or combination of material are also contemplated.

As one example construction, first stringers 106 and first panel 102 are mechanically coupled (e.g., fastened together) and/or second stringers 108 and second panel 104 are mechanically coupled (e.g., fastened together).

As one example construction, first stringers 106 and first panel 102 are secondarily bonded (e.g., adhesively bonded together) and/or second stringers 108 and second panels 104 are secondarily bonded (e.g., adhesively bonded together).

As one example construction, first stringers 106 and first panel 102 are co-bonded (e.g., a co-bonded composite) and/or second stringers 108 and second panels 104 are co-bonded (e.g., a co-bonded composite).

As one example construction, first stringers 106 and first panel 102 are co-cured (e.g., a co-cured composite) and/or second stringers 108 and second panels 104 are co-cured (e.g., a co-cured composite). As one example, first stringers 106 are three-dimensional composite stitched to first panel 102 and/or second stringers 108 are three-dimensional composite stitched to second panel 104.

Those skilled in the art will recognize that the particular technique used to couple first stringers 106 to first panel 102 and/or second stringers 108 to second panel 104 may depend upon various factors, for example, the material of first panel 102, second panel 104, first stringers 106 and/or second stringers 108.

Referring generally to FIGS. 1 and 2, and particularly to, e.g., FIG. 4, each of braces 200 comprises chassis 202. Chassis 202 comprises first interlocks 204 and second interlocks 206 opposite first interlocks 204. First interlocks 204 are geometrically engaged with one of stringer pairs A of first stringers 106 and second interlocks 206 are geometrically engaged with one of stringer pairs B of second stringers 108. The preceding subject matter of this paragraph characterizes example 2 of the present disclosure, wherein example 2 includes the subject matter of example 1, above.

Geometrically engaging first interlocks 204 of each of braces 200 with one of stringer pairs A of first stringers 106 and geometrically engaging second interlocks 206 of each of braces 200 with one of stringer pairs B of second stringers 108 constrains each of braces 200 in all directions along plane 112 without the need to fasten each of braces 200 to first stringers 106 and/or second stringers 108.

As one example, and as best illustrated in FIG. 4, braces 200 are configured (e.g., suitably sized and/or shaped) to engage (e.g., make surface contact with) only stringer pairs A of first stringers 106 and only stringer pairs B of second stringers 108. As one example, opposed ends, for example, first end 214 and/or second end 216 of each of braces 200 (FIGS. 8-10), extend proximate (e.g., at or near) first panel 102 and/or second panel 104 but do not make surface contact with first panel 102 and/or second panel 104.

As one example, and as best illustrated in FIG. 5, braces 200 are configured (e.g., suitably sized and/or shaped) to engage (e.g., make surface contact with) stringer pairs A of first stringers 106, first panel 102, stringer pairs B of second stringers 108 and second panel 104. As one example, opposed ends, for example, first end 214 and/or second end 216 of each of braces 200 (FIGS. 8-10), extend to first panel 102 and/or second panel 104 and make surface contact with first panel 102 and/or second panel 104.

Referring generally to FIGS. 1 and 2, and particularly to, e.g., FIGS. 3-5, structure 100 further comprises first end 114 and second end 116 opposed to first end 114. Structure 100 also comprises first side 118 and second side 120 opposed to first side 118. First stringers 106 and second stringers 108 extend in longitudinal direction 122 between first end 114 and second end 116. Braces 200 comprise row 208 of braces 200 extending in lateral direction 124 between first side 118 and second side 120. Row 208 of braces 200 comprises at least one of braces 200. The preceding subject matter of this paragraph characterizes example 3 of the present disclosure, wherein example 3 includes the subject matter of example 2, above.

Geometrically interlocking a plurality of first stringers 106 (e.g., a plurality of stringer pairs A) and a plurality of second stringers 108 (e.g., a plurality of stringer pairs B) with row 208 of braces 200 reduces the time, expense, complexity and/or difficulty in manufacturing (e.g., assembly of) structure 100.

As one example, structure 100 is the wing of the aircraft and lateral direction 124 of structure 100 is the chordwise direction of the wing. As one example, structure 100 (e.g., the wing) includes a lateral dimension (e.g., a width).

As one example, row 208 of braces 200 appropriately positions first panel 102 relative to second panel 104. As one example, row 208 of braces 200 maintains (e.g., incorporates or defines) the shape of structure 100 in lateral direction 124. For instance, row 208 of braces 200 maintains the shape of the wing in the chordwise direction. As one example, row 208 of braces 200 defines a thickness of structure 100 in lateral direction 124, for example, a thickness of the wing of the aircraft in the chordwise direction. As one example, row 208 of braces 200 transfers tension loads and/or compression loads between first panel 102 and second panel 106, for example, along lateral direction 124.

Referring generally to FIGS. 1 and 2, and particularly to, e.g., FIGS. 4 and 5, one of braces 200 of row 208 of braces 200 is coupled to another one of braces 200 of row 208 of braces 200. The preceding subject matter of this paragraph characterizes example 4 of the present disclosure, wherein example 4 includes the subject matter of example 3, above.

Coupling one of braces 200 of row 208 of braces 200 to another one of braces 200 of row 208 of braces 200 secures the one of braces 200 of row 208 of braces 200 to prevent movement of the one of braces 200 of row 208 of braces 200 relative to the another one of braces 200 of row 208 of braces 200.

As one example, one of braces 200 is coupled to another one of braces 200 laterally adjacent (e.g., in lateral direction 124) to the one of braces 200.

As one example, coupling one of braces 200 of row 208 of braces 200 to another one of braces 200 of row 208 of braces 200 constrains movement of the one of braces 200 and/or the other one of braces 200 in any direction disposed at a non-zero angle relative to plane 112.

As one example, coupling one of braces 200 of row 208 of braces 200 to another one of braces 200 of row 208 of braces 200 prevents movement of the one of braces 200 in a direction generally parallel to first stringers 106 and second stringers 108.

As one example, coupling one of braces 200 of row 208 of braces 200 to another one of braces 200 of row 208 of braces 200 prevents movement of the one of braces 200 in a direction generally perpendicular to plane 112.

As one example, coupling one of braces 200 of row 208 of braces 200 to another one of braces 200 of row 208 of braces 200 prevents angular movement of the one of braces 200 relative to the another one of braces 200.

As one example, coupling each one of braces 200 of row 208 of braces 200 together, for example, to another one of laterally adjacent braces 200 forms a rigid row 208 of braces 200 in lateral direction 124.

As one example, one of braces 200 of row 208 of braces 200 is mechanically coupled to another one of braces 200 of row 208 of braces 200. As one example, one of braces 200 of row 208 of braces 200 and another one of braces 200 of row 208 of braces 200 are mechanically fastened, for example, by a plurality of fasteners (illustrated but not explicitly identified in FIG. 5).

As one example, one of braces 200 of row 208 of braces 200 and another one of braces 200 of row 208 of braces 200 are adhesively bonded together.

As one example, one of braces 200 of row 208 of braces 200 is otherwise rigidly joined to another one of braces 200 of row 208 of braces 200. As one example, one of braces 200 of row 208 of braces 200 is welded to another one of braces 200 of row 208 of braces 200.

As one example, one of braces 200 of row 208 of braces 200 is coupled to another one of braces 200 of row 208 of braces 200 by a combination of coupling techniques, for example, mechanically fastening and adhesively bonding.

Referring generally to FIGS. 1 and 2, and particularly to, e.g., FIGS. 3 and 5, structure 100 further comprises first spar 126 coupled to first panel 102 and second panel 104 along first side 118 of structure 100. Structure 100 also comprises second spar 128 coupled to first panel 102 and second panel 104 along second side 120 of structure 100. Row 208 of braces 200 is coupled to first spar 126 and second spar 128. The preceding subject matter of this paragraph characterizes example 5 of the present disclosure, wherein example 5 includes the subject matter of any of examples 3 or 4, above.

Coupling first spar 126 and second spar 128 to first panel 102 and second panel 104 encloses structure 100, for example, along first side 118 and second side 120 of structure 100, respectively, and adds rigidity to structure 100. Coupling row 208 of braces 200 to first spar 126 and second spar 128 prevents movement of row 208 of braces 200 and adds rigidity and load bearing capabilities to structure 100.

As one example, coupling first spar 126 and second spar 128 to first panel 102 and second panel 104 and coupling row 208 of braces 200 maintains the relative position of first panel 102 and second panel 104. As one example, coupling first spar 126 and second spar 128 to first panel 102 and second panel 104 and coupling row 208 of braces 200 transfers tension loads and/or compression loads between first panel 102 and second panel 106.

As one example, a space between first panel 102 and second panel 104 at first end 118 and second end 120 of structure 100 are initially open, for example, prior to and during installation of braces 200 and/or row 208 of braces 200. First spar 126 and second spar 128 cover the open space between first panel 102 and second panel 104 at first end 118 and second end 120 of structure 100 to complete manufacture (e.g., assembly) of structure 100.

As one example construction, and as best illustrated in FIGS. 5 and 7, each of first spar 126 and second spar 128 is a C-shaped spar. As one example, first spar 126 and second spar 128 include wall portion 152, first tab portion 154 extending from an end of wall portion 152 and second tab portion 156 extending from an opposed end of wall portion 152, for example, opposite first tab portion 154. Wall portion 152 extends between first panel 102 and second panel 104, for example, covering the open space between first panel 102 and second panel 104. First tab portion 154 is coupled to first panel 102. Second tab portion 154 is coupled to second panel 104.

As one example, and as best illustrated in FIGS. 5 and 7, first spar 126 at least partially surrounds first panel 102 and second panel 104 at first side 118. Second spar 128 at least partially surrounds first panel 102 and second panel 104 at second side 120. While FIG. 7 explicitly illustrates only first spar 126, second spar 128 may be the same as first spar 126. As one example, first tab portion 154 of first spar 126 is in surface contact with and is coupled to exterior surface 158 of first panel 102, for example, proximate (e.g., at or near) first side 118 of structure 100. Second tab portion 156 of first spar 126 is in surface contact with and is coupled to exterior surface 160 of second panel 104, for example, proximate first side 118 of structure 100. As one example, first tab portion 154 of second spar 128 is in surface contact with and is coupled to exterior surface 158 of first panel 102, for example, proximate second side 120 of structure 100. Second tab portion 156 of second spar 128 is in surface contact with and is coupled to exterior surface 160 of second panel 104, for example, proximate second side 120 of structure 100.

As one example (not explicitly illustrated), first spar 126 fits between first panel 102 and second panel 104 at first side 118. Second spar 128 fits between first panel 102 and second panel 104 at second side 120. As one example, first tab portion 154 of first spar 126 is in surface contact with and is coupled to interior surface 162 of first panel 102, for example, proximate first side 118 of structure 100. Second tab portion 156 of first spar 126 is in surface contact with and is coupled to interior surface 164 of second panel 104, for example, proximate first side 118 of structure 100. As one example, first tab portion 154 of second spar 128 is in surface contact with and is coupled to interior surface 162 of first panel 102, for example, proximate second side 120 of structure 100. Second tab portion 156 of second spar 128 is in surface contact with and is coupled to interior surface 164 of second panel 104, for example, proximate second side 120 of structure 100.

As one example, first spar 126 and second spar 128 are adhesively bonded to first panel 102 and second panel 104. As one example, and as best illustrated in FIG. 7, adhesive 166 is applied between first tab portion 154 and exterior surface 158 of first panel 102 and adhesive 166 is applied between second tab portion 156 and exterior surface 160 of second panel 104. As one example (not explicitly illustrated), adhesive 166 is applied between first tab portion 154 and interior surface 162 of first panel 102 and adhesive 166 is applied between second tab portion 156 and interior surface 164 of second panel 104.

As one general, non-limiting example, adhesive 166 is an epoxy-based adhesive. As one example, adhesive 166 is in and/or is applied as a liquid form. For example, adhesive 166 in the liquid form may be applied with a brush or a roller to interface areas (e.g., between at least one of first spar 126, first panel 102, and/or second panel 104 and between at least one of second spar 128, first panel 102, and/or second panel 104). As one example, adhesive 166 is in and/or is applied as a sheet or film form. For example, adhesive 166 is in the sheet or film form may be cut (e.g., die cut) into an appropriate shape and applied to interface areas (e.g., between at least one of first spar 126, first panel 102, and/or second panel 104 and between at least one of second spar 128, first panel 102, and/or second panel 104).

As one specific, non-limiting example, adhesive 166 is Scotch-Weld™ structural film adhesive commercially available from 3M™ Corporation of St. Paul, Minn. As one specific, non-limiting example, adhesive 166 is Hysol® PL 696™ structural film adhesive commercially available from Henkel Corporation of Rocky Hill, Conn.

As one example, adhesive 166 may be applied to the interface areas manually. As one example, adhesive 166 may be applied to the interface areas by an automated system, for example, a robotic arm with an application specific end effector (not illustrated).

As one example, adhesive 166 is cured during a curing process. As one example, the curing process may be a high-temperature curing process. As one example, the curing process may be a medium-temperature curing process. As one example, the curing process may be an autoclave curing process. Those skilled in the art will recognize that the particular curing process may depend on various factors, for example, the selected formulation of adhesive 166.

As one example, first spar 126 and second spar 128 are mechanically coupled to first panel 102 and second panel 104. As one example, first tab portion 154 is mechanically fastened to first panel 102, for example, by fasteners (not illustrated) and second tab portion 156 is mechanically fastened to second panel 104, for example, by fasteners (not illustrated).

As one example, first spar 126 and second spar 128 are otherwise rigidly joined to first panel 102 and second panel 104. As one example, first tab portion 154 is welded to first panel 102 and second tab portion 156 is welded to second panel 104.

As one example, first spar 126 and second spar 128 are coupled to first panel 102 and second panel 104 by a combination of coupling techniques, for example, mechanically fastening and adhesively bonding.

As one example, each of first spar 126 and/or second spar 128 is formed of a metal material. As one example, each of first spar 126 and/or second spar 128 is formed of a composite material. As one example, at least one of first spar 126 and/or second spar 128 is formed of one of a metal material or a composite material. Other materials and/or combination of material are also contemplated.

Those skilled in the art will recognize that the particular technique used to couple first spar 126 to first panel 102 and second panel 104 and/or second spar 128 to first panel 102 and second panel 104 may depend upon various factors, for example, the material of first panel 102, second panel 104, first spar 126 and/or second spar 128.

Referring generally to FIGS. 1 and 2, and particularly to, e.g., FIGS. 3, 5, and 7, structure 100 further comprises two end braces 210. A first one of two end braces 210 is coupled to one of braces 200 of row 208 of braces 200 and a second one of two end braces 210 is coupled to another one of braces 200 of row 208. The first one of two end braces 210 is coupled to first spar 126 and the second one of two end braces 210 is coupled to second spar 128. The preceding subject matter of this paragraph characterizes example 6 of the present disclosure, wherein example 6 includes the subject matter of example 5, above.

Coupling one of two end braces 210 between row 208 of braces 200 and each one of first spar 126 and second spar 128 interconnects row 208 of braces 200 and first spar 126 and second spar 128 to prevent movement of row 208 of braces 200 and add rigidity and load bearing capabilities to structure 100.

As one example, and as best illustrated in FIG. 5, each one of two end braces 210 is coupled to an outermost one of braces 200, for example, opposed in lateral direction 124, of row 208 of braces 200. As one example, the outermost one of braces 200 of row 208 of braces 200 is brace 200 geometrically interlocked with outermost stringer pair A and outermost stringer pair B, for example, stringer pair A and stringer pair B closest to first side 118 and second side 120, respectively.

As one example, each one of two end braces 210 is mechanically coupled to one of braces 200 of row 208 of braces 200. As one example, each one of two end braces 210 and one of braces 200 of row 208 of braces 200 are mechanically fastened, for example, by a plurality of fasteners (illustrated but not explicitly identified in FIGS. 5 and 7).

As one example, each one of two end braces 210 and one of braces 200 of row 208 of braces 200 are adhesively bonded together.

As one example, each one of two end braces 210 is otherwise rigidly joined to one of braces 200 of row 208 of braces 200. As one example, each one of two end braces 210 and one of braces 200 of row 208 of braces 200 are welded together.

As one example, each one of two end braces 210 is coupled to one of braces 200 of row 208 of braces 200 by a combination of coupling techniques, for example, mechanically fastening and adhesively bonding.

As one example, and as best illustrated in FIG. 7, each one of two end braces 210 includes one first interlock 204 geometrically engaged with one of first stringers 106 of the outermost stringer pair A and one second interlock 204 geometrically engaged with one of second stringers 108 of outermost stringer pair B.

As one example (not explicitly illustrated), each one of two end braces 210 does not geometrically engage or otherwise contact the one of first stringers 106 of the outermost stringer pair A or the one of second stringers 108 of outermost stringer pair B.

As one example, and as best illustrated in FIGS. 5 and 7, each one of two end braces 210 is configured (e.g., suitably sized and/or shaped) to engage (e.g., make surface contact with) only the one of first stringers 106 of the outermost stringer pair A or the one of second stringers 108 of outermost stringer pair B. As one example, opposed ends of each one of two end braces 210 extend proximate (e.g., at or near) first panel 102 and/or second panel 104 but do not make surface contact with first panel 102 and/or second panel 104.

As one example (not explicitly illustrated), each one of two end braces 210 is configured (e.g., suitably sized and/or shaped) to engage (e.g., make surface contact with) the one of first stringers 106 of the outermost stringer pair A, first panel 102, the one of second stringers 108 of outermost stringer pair B and second panel 104. As one example, opposed ends of each one of two end braces 210 extend to first panel 102 and/or second panel 104 and make surface contact with first panel 102 and/or second panel 104.

As one example (not explicitly illustrated), each one of two end braces 210 is configured (e.g., suitably sized and/or shaped) to engage (e.g., make surface contact with) only first panel 102 and second panel 104 and not engage the one of first stringers 106 of the outermost stringer pair A or the one of second stringers 108 of outermost stringer pair B and second panel 104. As one example, each one of two end braces 210 do not include first interlock 204 or second interlock 206 and opposed ends of each one of two end braces 210 extend to first panel 102 and/or second panel 104 and make surface contact with first panel 102 and/or second panel 104.

As one example, each one of two end braces 210 is formed of a metal material. As one example, each one of two end braces 210 is formed of a composite material. As one example, at least one of two end braces 210 is formed of one of a metal material or a composite material. Other materials and/or combination of material are also contemplated.

Those skilled in the art will recognize that the particular technique used to couple each one of two end braces 210 to one of braces 200 of row 208 of braces 200 may depend upon various factors, for example, the material of two end braces 210 and/or the one of braces 200 of row 208 of braces 200.

Referring generally to FIGS. 1 and 2, and particularly to, e.g., FIGS. 3, 5, and 7, first spar 126 comprises first spar flanges 130 and second spar 128 comprises second spar flanges 132. The first one of two end braces 210 is joined to one of first spar flanges 130 of first spar 126 and the second one of two end braces 210 is joined to one of second spar flanges 132 of second spar 128. The preceding subject matter of this paragraph characterizes example 7 of the present disclosure, wherein example 7 includes the subject matter of example 6, above.

First spar flanges 130 enables coupling of one of two end braces 210 to first spar 126 and second spar flanges 132 enable coupling of an opposed one of two end braces 210 in order to couple row 208 of braces 200 to first spar 126 and second spar 128.

As one example, and as best illustrated in FIGS. 5 and 7, first spar flanges 130 extend inwardly through the open space defined between first panel 102 and second panel 104 at first side 118. Second spar flanges 132 extend inwardly through the open space defined between first panel 102 and second panel 104 at second side 120. As one example, first spar flanges 130 extend, for example, perpendicularly, from wall portion 152 of first spar 126. Second spar flanges 132 extend, for example, perpendicularly, from wall portion 152 of second spar 126.

As one example, one of two end braces 210 is mechanically coupled to one of first spar flanges 130 of first spar 126 and another one of two end braces 210 is mechanically coupled to one of second spar flanges 132 of second spar 128. As one example, and as best illustrated in FIGS. 5 and 7, one of two end braces 210 and one of first spar flanges 130 of first spar 126 are mechanically fastened together, for example, by a plurality of fasteners (illustrated but not explicitly identified in FIGS. 5 and 7) and another one of two end braces 210 and one of second spar flanges 132 of second spar 128 are mechanically fastened together, for example, by a plurality of fasteners (illustrated but not explicitly identified in FIG. 5).

As one example, one of two end braces 210 is adhesively bonded to one of first spar flanges 130 of first spar 126 and another one of two end braces 210 is adhesively bonded to one of second spar flanges 132 of second spar 128.

As one example, one of two end braces 210 is otherwise rigidly joined to one of first spar flanges 130 of first spar 126 and another one of two end braces 210 is otherwise rigidly joined to one of second spar flanges 132 of second spar 128. As one example, one of two end braces 210 and one of first spar flanges 130 of first spar 126 are welded together and another one of two end braces 210 and one of second spar flanges 132 of second spar 128 are welded together.

Those skilled in the art will recognize that the particular technique used to couple two end braces 210 to first spar 126 and second spar 128 may depend upon various factors, for example, the material of two end braces 210, first spar 126 and/or second spar 128.

Referring generally to FIGS. 1 and 2, and particularly to, e.g., FIGS. 3-6, structure 100 further comprises first end 114 and second end 116 opposed to first end 114. Structure 100 also comprises first side 118 and second side 120 opposed to first side 118. First stringers 106 and second stringers 108 extend in longitudinal direction 122 between first end 114 and second end 116. Braces 200 comprise rows 208 of braces 200. Each of rows 208 of braces 200 extends in lateral direction 124 between first side 118 and second side 120. Rows 208 are arranged in array 212, extending in longitudinal direction 122 between first end 114 and second end 116, and each of rows 208 of braces 200 comprises at least one of braces 200. The preceding subject matter of this paragraph characterizes example 8 of the present disclosure, wherein example 8 includes the subject matter of example 2, above.

Arranging rows 208 in array 212 spans a length of structure 100 in longitudinal direction 122. Geometrically interlocking a plurality of first stringers 106 (e.g., a plurality of stringer pairs A) and a plurality of second stringers 108 (e.g., a plurality of stringer pairs B) with array 212 of rows 208 of braces 200 maintains the shape of structure and add rigidity and load bearing capabilities to structure 100.

As one example, structure 100 is the wing of the aircraft and longitudinal direction 122 of structure 100 is the spanwise direction of the wing. As one example, structure 100 (e.g., the wing) includes a longitudinal dimension (e.g., a length).

As one example, array 212 of rows 208 of braces 200 appropriately positions first panel 102 relative to second panel 104. As one example, array 212 of rows 208 of braces 200 maintains (e.g., incorporates or defines) the shape of structure 100 in longitudinal direction. For instance, array 212 of rows 208 of braces 200 maintains the shape of the wing in the spanwise direction. As one example, array 212 of rows 208 of braces 200 defines the thickness of structure 100 in longitudinal direction 122, for example, the thickness of the wing of the aircraft in the spanwise direction. As one example, array 212 of rows 208 of braces 200 transfers tension loads and/or compression loads between first panel 102 and second panel 106, for example, along longitudinal direction 122.

As one example, and as best illustrated in FIG. 6, each one of rows 208 in array 212 of rows 208 is spaced apart from another one of rows 208 in array 212 off rows 208 in longitudinal direction 122. As one example, array 212 of rows 208 extends from proximate (e.g., at or near) first end 114 to proximate second end 116.

Referring generally to FIGS. 1 and 2, and particularly to, e.g., FIGS. 4 and 5, one of braces 200 of each of rows 208 of braces 200 is coupled to another one of braces 200 laterally adjacent to the at least one of braces 200. The preceding subject matter of this paragraph characterizes example 9 of the present disclosure, wherein example 9 includes the subject matter of example 8, above.

Coupling one of braces 200 of row 208 of braces 200 of array 212 to another one of braces 200 of row 208 of braces 200 of array 212 secures the one of braces 200 of row 208 of braces 200 to prevent movement of the one of braces 200 of row 208 of braces 200 relative to the another one of braces 200 of row 208 of braces 200.

Referring generally to FIGS. 1 and 2, and particularly to, e.g., FIGS. 3 and 5, structure 100 further comprises first spar 126 coupled to first panel 102 and second panel 104 along first side 118 of structure 100. Structure 100 also comprises second spar 128 coupled to first panel 102 and second panel 104 along second side 120 of structure 100. Each of rows 208 of braces 200 is coupled to first spar 126 and second spar 128. The preceding subject matter of this paragraph characterizes example 10 of the present disclosure, wherein example 10 includes the subject matter of any of examples 8 or 9, above.

Coupling first spar 126 and second spar 128 to first panel 102 and second panel 104 encloses structure 100, for example, along first side 118 and second side 120 of structure 100, respectively, and adds rigidity to structure 100. Coupling each of rows 208 of braces 200 to first spar 126 and second spar 128 prevents movement of each of rows 208 of braces 200 and adds rigidity and load bearing capabilities to structure 100.

Referring generally to FIGS. 1 and 2, and particularly to, e.g., FIGS. 5 and 7, structure 100 further comprises two end braces 210. One of the two end braces 210 is coupled to one of braces 200 of one of rows 208 of braces 200 and another one of the two end braces 210 is coupled to another one of braces 200 of the one of rows 208. A first one of the two end braces 210 is coupled to first spar 126 and a second one of the two end braces 210 is coupled to second spar 128. The preceding subject matter of this paragraph characterizes example 11 of the present disclosure, wherein example 11 includes the subject matter of example 10, above.

Coupling one of two end braces 210 between one of rows 208 of braces 200 and each one of first spar 126 and second spar 128 interconnects the one of rows 208 of braces 200 and first spar 126 and second spar 128 to prevent movement of the one of rows 208 of braces 200 and add rigidity and load bearing capabilities to structure 100.

Referring generally to FIGS. 1 and 2, and particularly to, e.g., FIGS. 3, 5 and 7, first spar 126 comprises first spar flanges 130 and second spar 128 comprises second spar flanges 132. The first one of the two end braces 210 is joined to one of first spar flanges 130 of first spar 126 and the second one of the two end braces 210 is joined to one of second spar flanges 132 of second spar 128. The preceding subject matter of this paragraph characterizes example 12 of the present disclosure, wherein example 12 includes the subject matter of example 11, above.

First spar flanges 130 enables coupling of one of two end braces 210 to first spar 126 and second spar flanges 132 enable coupling of an opposed one of two end braces 210 in order to couple each one of rows 208 of braces 200 to first spar 126 and second spar 128.

Referring generally to FIGS. 1 and 2, and particularly to, e.g., FIG. 5, structure 100 further comprises hermetic seal 134 between at least two of rows 208 of braces 200 and first panel 102, second panel 104, first stringers 106, second stringers 108, first spar 126, and second spar 128. The preceding subject matter of this paragraph characterizes example 13 of the present disclosure, wherein example 13 includes the subject matter of any of examples 11 or 12, above.

Applying hermetic seal 134 between at least two of rows 208 of braces 200 and first panel 102, second panel 104, first stringers 106, second stringers 108, first spar 126, and second spar 128 tightly closes and unites the at least two of rows 208 of braces 200 and first panel 102, second panel 104, first stringers 106, second stringers 108, first spar 126, and second spar 128.

As one example, hermetic seal 134 is formed between and around any common contact surfaces of at least two of rows 208 of braces 200 and first panel 102, second panel 104, first stringers 106, second stringers 108, first spar 126, and second spar 128.

As one example, hermetic seal 134 is a liquid-impermeable seal (e.g., a fluid-tight seal). As one example, hermetic seal 134 is a gas-impermeable seal (e.g., an air-tight seal).

As one general, non-limiting example, hermetic seal 134 is an adhesive. As one general, non-limiting example, hermetic seal 134 is rubber sealant. As one general, non-limiting example, hermetic seal 134 is a silicone sealant. As one general, non-limiting example, hermetic seal 134 is a fluorosilicone sealant. As one specific, non-limiting example, hermetic seal 134 is 730 FS solvent resistant sealant commercially available from Dow Corning® Corporation of Midland, Mich.

As one example, hermetic seal 134 is applied (e.g., manually or by an automated system) by brushing hermetic seal 134 into the corners of part interfaces, for example, everywhere there are gaps or crevices through which fuel could seep.

Referring generally to FIGS. 1 and 2, and particularly to, e.g., FIG. 5, hermetic seal 134 is also between braces 200 of the at least two of rows 208 of braces 200. The preceding subject matter of this paragraph characterizes example 14 of the present disclosure, wherein example 14 includes the subject matter of example 13, above.

Applying hermetic seal 134 between braces 200 of at least two of rows 208 of braces 200 tightly closes and unites braces 200 of the at least two of rows 208 of braces 200.

As one example, hermetic seal 134 is formed between and around any common contact surfaces of each one of braces 200 and another one of braces 200 laterally adjacent to the one of braces 200 of the at least two rows 208 of braces 200.

As one example, and as best illustrated in FIG. 6, the at least two rows 208 of braces 200 that are hermetically sealed (e.g., hermetic seal 134 is applied between at least two of rows 208 of braces 200 and first panel 102, second panel 104, first stringers 106, second stringers 108, first spar 126, and second spar 128 and between braces 200 of the at least two of rows 208 of braces 200) form a sealed compartment 168 within an interior of structure 100. As one example, the at least two rows 208 of braces 200 that are hermetically sealed form a sealed fuel compartment (e.g., compartment 168) within the wing of the aircraft.

As one example, the at least two rows 208 of braces 200 that are hermetically sealed are longitudinally adjacent rows 208 of braces 200 of array 212 of rows 208.

As one example, at least one of rows 208 of array 212 of rows 208 is disposed between the at least two rows 208 of braces 200 that are hermetically sealed. The at least one of rows 208 of array 212 of rows 208 disposed between the at least two rows 208 of braces 200 that are hermetically sealed is configured to allow fuel to pass through the at least one of rows 208 of array 212 of rows 208 disposed between the at least two rows 208 of braces 200 that are hermetically sealed.

Referring generally to FIGS. 1 and 2, and particularly to, e.g., FIGS. 4 and 8-10, each of braces 200 further comprises first end 214 and second end 216, opposite first end 214. Each of braces 200 also comprises first side 218, extending between first end 214 and second end 214, and second side 220, extending between first end 214 and second end 214 opposite first side 218. Additionally, each of braces 200 comprises two first corners 222, adjacent first end 214, and two second corners 224, adjacent second end 216. A first one of first interlocks 204 is located at one of two first corners 222 of each of braces 200 and a second one of first interlocks 204 is located at another one of two first corners 222 of each of braces 200. A first one of second interlocks 206 is located at one of two second corners 224 of each of braces 200 and the second one of second interlocks 206 is located at another one of two second corners 224 of each of braces 200. The preceding subject matter of this paragraph characterizes example 15 of the present disclosure, wherein example 15 includes the subject matter of any of examples 2-14, above.

First interlocks 204 being located at opposing two first corners 222 and second interlocks 206 being located at opposing two second corners 224 appropriately positions first interlocks 204 relative to one of stringer pairs A of first stringers 106 to geometrically engage the one of stringer pairs A of first stringers 106 and appropriately positions second interlocks 206 relative to one of stringer pairs B of second stringers 108, opposite the one of stringer pairs A, to geometrically engage the one of stringer pairs B of second stringers 108.

As one example, one of two first corners 222 is formed by first end 214 and first side 218, another one of two first corners 222 is formed by first end 214 and second side 220, one of two second corners 224 is formed by second end 216 and first side 218, and another one of two second corners 224 is formed by second end 216 and second side 220.

As one example, and as best illustrated in FIG. 4, first end 214 extends completely between one of stringer pairs A of first stringers 106 to geometrically engage each one of first interlocks 204 with the one of stringer pairs A of first stringers 106 (e.g., place each one of first interlocks 204 in surface contact with the one of stringer pairs A of first stringers 106). Second end 216 extends completely between one of stringer pairs B of second stringers 108 to geometrically engage each one of second interlocks 206 with the one of stringer pairs B of second stringers 108 (e.g., place each one of second interlocks 206 in surface contact with the one of stringer pairs B of second stringers 108).

As one example, and as best illustrated in FIGS. 5 and 8, at least one of braces 200, for example, one of braces 200 of row 208 of braces 200, is configured to contact first panel 102 and second panel 104. As one example, first end 214 of one of braces 200 extends to and is in surface contact with interior surface 162 of first panel 102. Second end 216 of one of braces 200 extends to and is in surface contact with interior surface 164 of second panel 104.

As one example, and as best illustrated in FIG. 5, hermetic seal 134 is at least partially located (e.g., formed) between first end 214 of one of braces 200 and interior surface 162 of first panel 102 and between second end 216 of one of braces 200 and interior surface 164 of second panel 104. Hermetic seal 134 is at least partially located (e.g., formed) between first interlocks 204 and one of stringer pairs A of first stringers 106 and between second interlocks 206 and one of stringer pairs B of second stringers 108. Hermetic seal 134 is at least partially located (e.g., formed) between one of braces 200 of row 208 of braces 200 and another one of braces 200 of row 208 of braces 200 laterally adjacent to the one of braces 200.

As one example, and as best illustrated in FIGS. 4, 7, 9 and 10, at least one of braces 200, for example, one of braces 200 of row 208 of braces 200, is configured not to contact first panel 102 and second panel 104. As one example, first end 214 of one of braces 200 extends toward but is not in surface contact with interior surface 162 of first panel 102. Second end 216 of one of braces 200 extends toward but is not in surface contact with interior surface 164 of second panel 104.

As one example, and as best illustrated in FIG. 4, first side 218 extends completely between a first one of first stringers 106 of one of stringer pairs A of first stringers 106 and a first one of second stringers 108 of one of stringer pairs B of second stringers 106 opposite the first one of first stringers 106 to geometrically engage a first one of first interlocks 204 with the first one of first stringers 106 of the one of stringer pairs A of first stringers 106 (e.g., place the first one of first interlocks 204 in surface contact with the first one of first stringers 106 of the one of stringer pairs A of first stringers 106) and geometrically engage a first one of second interlocks 206 with the first one of second stringers 108 of the one of stringer pairs B of second stringers 108 (e.g., place the first one of second interlocks 206 in surface contact with the first one of second stringers 108 of the one of stringer pairs B of second stringers 108). Second side 220 extends completely between a second one of first stringers 106 of the one of stringer pairs A of first stringers 106 and a second one of second stringers 108 of the one of stringer pairs B of second stringers 106 opposite the second one of first stringers 106 to geometrically engage a second one of first interlocks 204 with the second one of first stringers 106 of the one of stringer pairs A of first stringers 106 (e.g., place the second one of first interlocks 204 in surface contact with the second one of first stringers 106 of the one of stringer pairs A of first stringers 106) and geometrically engage a second one of second interlocks 206 with the second one of second stringers 108 of the one of stringer pairs B of second stringers 108 (e.g., place the second one of second interlocks 206 in surface contact with the second one of second stringers 108 of the one of stringer pairs B of second stringers 108).

Referring generally to FIGS. 1 and 2, and particularly to, e.g., FIGS. 4, 5, and 7-10, each of braces 200 further comprises first brace flange 226 along first side 218 of each of braces 200. Each of braces also comprises second brace flange 228 along second side 220 of each of braces 200. First brace flange 226 of one of braces 200 is joined to second brace flange 228 of another one of braces 200. The preceding subject matter of this paragraph characterizes example 16 of the present disclosure, wherein example 16 includes the subject matter of example 15, above.

First brace flange 226 and second brace flange 228 enable joining (e.g., connection) of one of braces 200 of one of rows 208 of braces 200 to another one of braces 200 of the one of rows 208 of braces 200.

As one example, first brace flange 226 extends outward, for example, perpendicularly outward, from first side 218 and second brace flange 228 extends outward, for example, perpendicularly outward, from second side 220. As one example, first bracket flange 226 and second bracket flange 228 are parallel.

As one example, and as best illustrated in FIGS. 4, 5, 7 and 8-10, first brace flange 226 extends along a portion of first side 218 and second brace flange 228 extends along a portion of second side 220. As one example, first brace flange 226 extends between a first one of first interlocks 204 and a first one of second interlocks 206 and second brace flange 228 extends between a second one of first interlocks 204 and a second one of second interlocks 206.

As one example, and as best illustrated in FIGS. 4 and 5, first brace flange 226 of one of braces 200 is configured (e.g., suitably sized and/or shaped) to extend between (e.g., fit between) a first one of first stringers 106 of one of stringer pairs A of first stringers 106 and a first one of second stringers 108 of one of stringer pairs B of second stringers 108 when the one of braces 200 is geometrically interlocked with the one of stringer pairs A of first stringers 106 and the one of stringer pairs B of second stringers 108. Second brace flange 228 of the one of braces 200 is configured (e.g., suitably sized and/or shaped) to extend between (e.g., fit between) a second one of first stringers 106 of the one of stringer pairs A of first stringers 106 and a second one of second stringers 108 of the one of stringer pairs B of second stringers 108 when the one of braces 200 is geometrically interlocked with the one of stringer pairs A of first stringers 106 and the one of stringer pairs B of second stringers 108.

As one example, a first one of braces 200 of one of rows 208 of braces 200 is geometrically interlocked with a first one of stringer pairs A of first stringers 106 and a first one of stringer pairs B of second stringers 108. A second one of braces 200 of the one of rows 208 of braces 200 is positioned laterally adjacent to the first one of braces 200 of the one of rows 208 of braces 200. The second one of braces 200 of the one of rows 208 of braces 200 is geometrically interlocked with a second one of stringer pairs A of first stringers 106 and a second one of stringer pairs B of second stringers 108. The first one of stringer pairs A and the second one of stringer pairs A share a common one of first stringers 106. The first one of stringer pairs B and the second one of stringer pairs B share a common one of second stringers 108.

As one example, upon the second one of braces 200 of the one of rows 208 of braces 200 being positioned laterally adjacent to the first one of braces 200 of the one of rows 208 of braces 200 and being geometrically interlocked with the second one of stringer pairs A of first stringers 106 and the second one of stringer pairs B of second stringers 108, first brace flange 226 of the second one of braces 200 of the one of rows 208 of braces 200 is aligned with second brace flange 228 of the first one of braces 200 of the one of rows 208 of braces 200. As one example, first brace flange 226 of the second one of braces 200 of the one of rows 208 of braces 200 and second brace flange 228 of the first one of braces 200 of the one of rows 208 of braces 200 engage one another (e.g., are in surface contact with one another).

As one example, first brace flange 226 of one of braces 200 of row 208 of braces 200 and second brace flange 228 of another one of braces 200 of row 208 of braces 200 laterally adjacent to the one of braces 200 are mechanically coupled together. As one example, first brace flange 226 of one of braces 200 of row 208 of braces 200 and second brace flange 228 of another one of braces 200 of row 208 of braces 200 laterally adjacent to the one of braces 200 are mechanically fastened together, for example, by a plurality of fasteners (illustrated but not explicitly identified in FIGS. 5 and 7).

As one example, a plurality of fastener holes (illustrated but not explicitly identified in FIGS. 4 and 8-10) are formed (e.g., machined) through first brace flange 226 and second brace flange 228 prior to geometrically interlocking each one of braces 200 with one of the stringer pairs A of first stringers 106 and one of stringer pairs B of second stringers 108.

As one example, the plurality of fastener holes (illustrated but not explicitly identified in FIGS. 4 and 8-10) are formed (e.g., machined) through first brace flange 226 and second brace flange 228 following each one of braces 200 being geometrically interlocked with one of stringer pairs A of first stringers 106 and one of stringer pairs B of second stringers 108.

As one example, first brace flange 226 of one of braces 200 of row 208 of braces 200 and second brace flange 228 of another one of braces 200 of row 208 of braces 200 laterally adjacent to the one of braces 200 are adhesively bonded together. As one example, an adhesive, for example, adhesive 236, is disposed (e.g., applied) between contacting surfaces of first brace flange 226 of one of braces 200 of row 208 of braces 200 and second brace flange 228 of another one of braces 200 of row 208 of braces 200 laterally adjacent to the one of braces 200.

As one example, first brace flange 226 of one of braces 200 of row 208 of braces 200 and second brace flange 228 of another one of braces 200 of row 208 of braces 200 laterally adjacent to the one of braces 200 are otherwise rigidly joined together. As one example, first brace flange 226 of one of braces 200 of row 208 of braces 200 and second brace flange 228 of another one of braces 200 of row 208 of braces 200 laterally adjacent to the one of braces 200 are welded together.

Referring generally to FIGS. 1 and 2, and particularly to, e.g., FIGS. 8-10, each of braces 200 comprises thickness T measured in thickness direction 230. First brace flange 226 and second brace flange 228 of each of braces 200 are offset from each other in thickness direction 230. The preceding subject matter of this paragraph characterizes example 17 of the present disclosure, wherein example 17 includes the subject matter of example 16, above.

First brace flange 226 and second brace flange 228 of each of braces 200 being offset enables one of braces 200 of one of rows 208 of braces 200 and another one of braces 200 of the one of rows 208 of braces 200 to be joined together along cooperating first brace flange 226 and second brace flange 228.

As one example, first brace flange 226 and second brace flange 228 of each of braces 200 being offset in thickness direction 230 enables first brace flange 226 of one of braces 200 of one of rows 208 of braces 200 to be positioned in a suitable position relative to (e.g., close to or in contact with) second brace flange 228 of another one of braces 200 of the one of rows 208 of braces 200 when the another one of braces 200 of the one of rows 208 of braces 200 is positioned laterally adjacent to the one of braces 200 of the one of rows 208 of braces 200 and is geometrically interlocked with one of stringer pairs A of first stringers 106 and one of stringer pairs B of second stringers 108.

As one example, and as best illustrated in FIGS. 8-10, each of braces 200, for example, chassis 202 of each of braces 200, includes surface 240 extending around a perimeter of each of braces 200. Surface 240 defines thickness T of first side 218, second side 220, first end 214, second end 216, first interlocks 204 and second interlocks 206.

As one example, first brace flange 226 extends outwardly from surface 240 defining first side 218 and is disposed at a first position along thickness direction 230. Second brace flange 228 extends outwardly from surface 240 defining second side 220 and is disposed at a second position along thickness direction 230. The first position along thickness direction 230 of first brace flange 226 and the second position along thickness direction 230 of second brace flange 228 are different. The linear distance between the first position along thickness direction 230 of first brace flange 226 and the second position along thickness direction 230 of second brace flange 228 defines the offset between first brace flange 226 and second brace flange 228. As one example, the offset is approximately a thickness of one of first brace flange 226 or second brace flange 228.

Referring generally to FIGS. 1 and 2, and particularly to, e.g., FIGS. 11 and 12 and FIGS. 4, 5 and 8-10, one of first interlocks 204 comprises first interlock surface 232 at least partially defining a first interlock geometric shape and one of second interlocks 206 comprises second interlock surface 234 at least partially defining a second interlock geometric shape. One of first stringers 106 comprises first stringer surface 136 at least partially defining a first stringer geometric shape complementary to the first interlock geometric shape and one of second stringers 108 comprises second stringer surface 138 at least partially defining a second stringer geometric shape complementary to the second interlock geometric shape. First interlock surface 232 of the one of first interlocks 204 contacts first stringer surface 136 of the one of first stringers 106. Second interlock surface 234 of the one of second interlocks 206 contacts second stringer surface 138 of the one of second stringers 108. The preceding subject matter of this paragraph characterizes example 18 of the present disclosure, wherein example 18 includes the subject matter of any of examples 2-17, above.

Contact between first interlock surface 232 of one of first interlocks 204 and first stringer surface 136 of one of first stringers 106 enables geometric engagement of the one first interlocks 204 with the one of first stringers 106 of one of stringer pairs A of first stringers 106 and contact between second interlock surface 234 of one of second interlocks 206 and second stringer surface 138 enables geometric engagement of the one second interlocks 206 with the one of second stringers 108 of one of stringer pairs B of second stringers 108.

As one example, a first portion of surface 240 defines first interlock surface 232 of one of first interlocks 204, a second portion of surface 240 defines first interlock surface 232 of another one of first interlocks 204, a third portion of surface 240 defines second interlock surface 232 of one of second interlocks 206, and a fourth portion of surface 240 defines second interlock surface 232 of another one of second interlocks 206.

As one example, the first interlock geometric shape of first interlock surface 232 of one of first interlocks 204 is defined by different portions of first interlock surface 232 being in different planes. As one example, a first portion of first interlock surface 232 is disposed in a first plane, a second portion of first interlock surface 232 is disposed in a second plane, and a third portion of first interlock surface 232 is disposed in a third plane. The second interlock geometric shape of first interlock surface 234 of one of second interlocks 206 is defined by different portions of second interlock surface 234 being in different planes. As one example, a first portion of second interlock surface 234 is disposed in a first plane, a second portion of second interlock surface 234 is disposed in a second plane, and a third portion of second interlock surface 234 is disposed in a third plane.

As one example, the first plane of the first portion of first interlock surface 232 and the second plane of the second portion of first interlock surface 232 intersect and are disposed at a non-zero angle relative to each other. The second plane of the second portion of first interlock surface 232 and the third plane of the third portion of first interlock surface 232 intersect and are disposed at a non-zero angle relative to each other. Similarly, the first plane of the first portion of second interlock surface 234 and the second plane of the second portion of second interlock surface 234 intersect and are disposed at a non-zero angle relative to each other. The second plane of the second portion of second interlock surface 234 and the third plane of the third portion of second interlock surface 234 intersect and are disposed at a non-zero angle relative to each other.

The first interlock geometric shape of first interlock surface 232 may depend upon or be configured to be complimentary to the first stringer geometric shape of first stringer surface 136. The second interlock geometric shape of second interlock surface 234 may depend upon or be configured to be complimentary to the second stringer geometric shape of second stringer surface 136. As one example, first interlock surface 232 may include fewer or additional portions disposed in fewer or additional planes depending on the first interlock geometric shape. Second interlock surface 234 may include fewer or additional portions disposed in fewer or additional planes depending on the second interlock geometric shape. As one example, the number of portions of first interlock surface 232 defining the first interlock geometric shape of first interlocks 204 depends upon the shape of first stringers 206, for example, the first stringer geometric shape of first stringer surface 136. The number of portions of second interlock surface 234 defining the second interlock geometric shape of second interlocks 204 depends upon the shape of second stringers 108, for example, the second stringer geometric shape of second stringer surface 136.

Referring generally to FIGS. 1 and 2, and particularly to, e.g., FIGS. 11 and 12, at least a portion of first interlock surface 232 of the one of first interlocks 204 is adhesively bonded to at least a portion of first stringer surface 136 of the one of first stringers 106. At least a portion of second interlock surface 234 of the one of second interlocks 206 is adhesively bonded to at least a portion of second stringer surface 138 of the one of second stringers 108. The preceding subject matter of this paragraph characterizes example 19 of the present disclosure, wherein example 19 includes the subject matter of example 18, above.

Adhesively bonding at least a portion of first interlock surface 232 of the one of first interlocks 204 to at least a portion of first stringer surface 136 of the one of first stringers 106 and adhesively bonding at least a portion of second interlock surface 234 of the one of second interlocks 206 to at least a portion of second stringer surface 138 of the one of second stringers 108 joins each of braces 200 to one of stringer pairs A of first stringers 106 and one of stringer pairs B of second stringers 108 and prevents movement, for example, in a direction parallel to one of first stringers 106 and one of second stringers 108.

As one general, non-limiting example, adhesive 236 is a paste adhesive. As one general, non-limiting example, adhesive 236 is an epoxy-based adhesive. As one example, adhesive 236 is in and/or is applied as a liquid form. For example, adhesive 236 in the liquid form may be applied with a brush or a roller to interface areas (e.g., between at least a portion of first interlock surface 232 of the one of first interlocks 204 and at least a portion of first stringer surface 136 of the one of first stringers 106 and at least a portion of second interlock surface 234 of the one of second interlocks 206 and at least a portion of second stringer surface 138 of the one of second stringers 108). As one example, adhesive 166 is in and/or is applied as a sheet or film form. For example, adhesive 166 is in the sheet or film form may be cut (e.g., die cut) into an appropriate shape and applied to interface areas (e.g., between at least a portion of first interlock surface 232 of the one of first interlocks 204 and at least a portion of first stringer surface 136 of the one of first stringers 106 and at least a portion of second interlock surface 234 of the one of second interlocks 206 and at least a portion of second stringer surface 138 of the one of second stringers 108).

As one specific, non-limiting example, adhesive 236 is Scotch-Weld™ structural film adhesive commercially available from 3M™ Corporation of St. Paul, Minn. As one specific, non-limiting example, adhesive 236 is Hysol® PL 696™ structural film adhesive commercially available from Henkel Corporation of Rocky Hill, Conn.

As one example, adhesive 236 may be applied to the interface areas manually. As one example, adhesive 236 may be applied to the interface areas by an automated system, for example, a robotic arm with an application specific end effector (not illustrated).

As one example, adhesive 236 may utilize a secondary process to cure adhesive and form the adhesive bond between first interlock surface 232 and first stringer surface 136 and the adhesive bond between second interlock surface 234 and second stringer surface 138. As one example, the secondary (e.g., curing) process may be a high-temperature curing process. As one example, the secondary process may be a medium-temperature curing process. As one example, the secondary process may be an autoclave curing process. Those skilled in the art will recognize that the particular curing process may depend on various factors, for example, the selected formulation of adhesive 236.

As one example, and as best illustrated in FIG. 11, adhesive 236 is disposed (e.g., applied) between first interlock surface 232 and first stringer surface 136. As one example, and as best illustrated in FIG. 12, adhesive 236 is disposed (e.g., applied) between second interlock surface 234 and second stringer surface 138.

As one example, adhesive 236 is applied to at least a portion of first interlock surface 232 of first interlocks 204 of one of braces 200 and to at least a portion of second interlock surface 234 of second interlocks 206 of the one of braces 200 prior to geometrically interlocking the one of braces 200 with one of stringer pairs A of first stringers 106 and one of stringer pairs B of second stringers 108.

As one example, adhesive 236 is applied to at least a portion of first interlock surface 232 of first interlocks 204 of one of braces 200 and to at least a portion of second interlock surface 234 of second interlocks 206 of the one of braces 200 following the one of braces 200 being geometrically interlocked with one of stringer pairs A of first stringers 106 and one of stringer pairs B of second stringers 108.

Referring generally to FIGS. 1 and 2, and particularly to, e.g., FIGS. 11 and 12 and FIGS. 3-5, the one of first stringers 106 comprises first foot 140 defining first portion I of first stringer surface 136. The one of first stringers 106 further comprises first web 142 projecting from first foot 140 and defining second portion I of first stringer surface 136. The one of first stringers 106 also comprises first crown 144 located at an end of first web 142 and defining third portion I of first stringer surface 136. The one of second stringers 108 comprises second foot 146 defining first portion II of second stringer surface 138. The one of second stringers 108 further comprises second web 148 projecting from second foot 146 and defining second portion II of second stringer surface 138. The one of second stringers 108 also comprises second crown 150 located at an end of second web 148 and defining third portion II of second stringer surface 138. The preceding subject matter of this paragraph characterizes example 20 of the present disclosure, wherein example 20 includes the subject matter of any of examples 18 or 19, above.

First foot 140, first web 142, and first crown 144 form the structural characteristics and the load-bearing characteristics of first stringers 106 and dictate the first interlock geometric shape of first interlock surface 232 of first interlocks 204. Second foot 146, second web 148, and second crown 150 form the structural characteristics and the load-bearing characteristics of second stringers 108 and dictate the second interlock geometric shape of second interlock surface 242 of second interlocks 206.

As one example, first foot 140 of each of first stringers 106 is coupled to interior surface 162 of first panel 102. As one example, first foot 140 is co-cured with first panel 102. As one example, first foot 140 is co-bonded with first panel 102. As one example, first foot 140 is secondarily bonded to first panel 102. As one example, first foot 140 is mechanically fastened to first panel 102. As one example, second foot 146 of each of second stringers 108 is coupled to interior surface 164 of second panel 104. As one example, second foot 146 is co-cured with second panel 104. As one example, second foot 146 is co-bonded with second panel 104. As one example, second foot 146 is secondarily bonded to second panel 104. As one example, second foot 146 is mechanically fastened to second panel 104.

As one example, and as best illustrated in FIG. 11, first portion I, second portion I, and third portion I of first stringer surface 136 define the first stringer geometric shape of one of first stringers 106. As one example, a first portion of first interlock surface 232 is complimentary to (e.g., matches) and geometrically engages first portion I of first stringer surface 136 formed by first foot 140 of one of first stringers 106. A second portion of first interlock surface 232 is complimentary to (e.g., matches) and geometrically engages second portion I of first stringer surface 136 formed by first web 142 of the one of first stringers 106. A third portion of first interlock surface 232 is complimentary to (e.g., matches) and geometrically engages third portion I of first stringer surface 136 formed by first crown 144 of the one of first stringers 106.

As one example, each side of first foot 140 defines first portion I of first stringer surface 136 to which a first portion of first interlock surface 232 of one of first interlocks 204 of one of braces 200 is geometrically engaged. Each side of first web 142 defines second portion I of first stringer surface 136 to which a second portion of first interlock surface 232 of the one of first interlocks 204 of the one of braces 200 is geometrically engaged. Each side of first crown 144 defines third portion I of first stringer surface 136 to which a third portion of first interlock surface 232 of the one of first interlocks 204 of the one of braces 200 is geometrically engaged.

As one example, thickness T of each one of braces 200 (e.g., of surface 240) defines the contact surface area between first interlock surface 232 and first stringer surface 136. The contact surface area between first interlock surface 232 and first stringer surface 136 may be sufficient to react to any tension (e.g., pull-off) loads applied to first panel 102, second panel 104 and/or braces 200.

As one example, and as best illustrated in FIG. 12, first portion II, second portion II, and third portion II of second stringer surface 138 define the second stringer geometric shape of one of second stringers 108. As one example, a first portion of second interlock surface 234 is complimentary to (e.g., matches) and geometrically engages first portion II of second stringer surface 138 formed by second foot 146 of one of second stringers 108. A second portion of second interlock surface 234 is complimentary to (e.g., matches) and geometrically engages second portion II of second stringer surface 138 formed by second web 148 of the one of second stringers 108. A third portion of second interlock surface 234 is complimentary to (e.g., matches) and geometrically engages third portion II of second stringer surface 138 formed by second crown 150 of the one of second stringers 108.

As one example, each side of second foot 146 defines first portion II of second stringer surface 138 to which a first portion of second interlock surface 234 of one of second interlocks 206 of one of braces 200 is geometrically engaged. Each side of second web 148 defines second portion II of second stringer surface 138 to which a second portion of second interlock surface 234 of the one of second interlocks 206 of the one of braces 200 is geometrically engaged. Each side of second crown 150 defines third portion II of second stringer surface 138 to which a third portion of second interlock surface 234 of the one of second interlocks 206 of the one of braces 200 is geometrically engaged.

As one example, thickness T of each one of braces 200 (e.g., of surface 240) defines the contact surface area between second interlock surface 234 and second stringer surface 138. The contact surface area between second interlock surface 234 and second stringer surface 138 may be sufficient to react to any tension (e.g., pull-off) loads applied to first panel 102, second panel 104 and/or braces 200.

Referring generally to FIGS. 1 and 2, and particularly to, e.g., FIGS. 11 and 12, first crown 144 of the one of first stringers 106 and second crown 150 of the one of second stringers 108 are hollow. The preceding subject matter of this paragraph characterizes example 21 of the present disclosure, wherein example 21 includes the subject matter of example 20, above.

First crown 144 of one of first stringers 106 and second crown 150 of one of second stringers 108 being hollow reduces the weight of structure 100.

As one example, first crown 144 of one or more of first stringers 106 and second crown 150 of one or more of second stringers 108 being hollow reduces the weight of the wing of the aircraft.

As one example, first stringers 106 and second stringers 108 are composites and, thus, first crown 144 and second crown 150 are composites. As one example, first stringers 106 and second stringers 108 are manufactured by positioning a bladder or mandrel (not illustrated) between composite layers (e.g., composite laminate or ply) to form a hollow section of first crown 144 and second crown 150 prior to performing a curing process. A curing process is a process that toughens or hardens a polymer material in the composite stringer, for example, in an oven or autoclave. The bladder is inflated to support the internal structure of first crown 144 and second crown 150 during the curing process. The bladder or mandrel is removed following the curing process to leave the hollow space formed within first crown 144 and second crown 150.

As one example, first crown 144 of one of first stringers 106 and second crown 150 of one of second stringers 108 define a foam filled interior. As one example, first crown 144 of one of first stringers 106 and second crown 150 of one of second stringers 108 may be formed with an interior hollow space and filled in a foam material. The foam material disposed within first crown 144 and second crown 144 increases the structural characteristics and the load-bearing characteristics of first stringers 106 and second stringers 108 but reduces their overall weight as compared to solid first stringers 106 and solid second stringers 108.

Referring generally to FIGS. 1 and 2, and particularly to, e.g., FIGS. 11 and 12, first crown 144 of the one of first stringers 106 and second crown 150 of the one of second stringers 108 each comprises a triangular cross-sectional shape. The preceding subject matter of this paragraph characterizes example 22 of the present disclosure, wherein example 22 includes the subject matter of any of examples 20 or 21, above.

First crown 144 having a triangular cross-sectional shape forms third portion I of first stringer surface 136 disposed in at least one plane and second crown 150 having a triangular cross-sectional shape forms third portion II of second stringer surface 138 disposed in at least one plane to react to tension loads applied to first panel 102 and/or second panel 104.

As one example, and as best illustrated in FIG. 11, one side of the triangular cross-sectional shape of first crown 144 defines third portion I of first stringer surface 136. Third portion I of first stringer surface 136 extends away from (e.g., is disposed relative to) second portion I of first stringer surface 136 at a non-zero angle (e.g., an obtuse angle—greater than 90-degrees and less than 180-degrees).

As one example, third portion I of first stringer surface 136 reacts with a third portion of first interlock surface 232 in response to a tension load applied to first panel 102 and/or second panel 104. As one example, first portion I of first stringer surface 136 reacts with a first portion of first interlock surface 232 in response to a compression load applied to first panel 102 and/or second panel 104.

As one example, and as best illustrated in FIG. 12, one side of the triangular cross-sectional shape of second crown 150 defines third portion II of second stringer surface 138. Third portion II of second stringer surface 138 extends away from (e.g., is disposed relative to) second portion II of second stringer surface 138 at a non-zero angle (e.g., an obtuse angle—greater than 90-degrees and less than 180-degrees).

As one example, third portion II of second stringer surface 13 reacts with a third portion of second interlock surface 234 in response to a tension load applied to first panel 102 and/or second panel 104. As one example, first portion II of second stringer surface 138 reacts with a first portion of second interlock surface 234 in response to a compression load applied to first panel 102 and/or second panel 104.

Referring generally to FIGS. 1 and 2, and particularly to, e.g., FIGS. 11 and 12, first crown 144 of the one of first stringers 106 and second crown 150 of the one of second stringers 108 each comprises a rectangular cross-sectional shape. The preceding subject matter of this paragraph characterizes example 23 of the present disclosure, wherein example 23 includes the subject matter of any of examples 20 or 21, above.

First crown 144 having a rectangular cross-sectional shape forms third portion I of first stringer surface 136 disposed in at least two planes and second crown 150 having a rectangular cross-sectional shape forms third portion II of second stringer surface 138 disposed in at least two planes to react to tension loads applied to first panel 102 and/or second panel 104.

As one example, one side of the rectangular cross-sectional shape of first crown 144 defines third portion I of first stringer surface 136. A first part of third portion I of first stringer surface 136 extends away from (e.g., is disposed relative to) second portion I of first stringer surface 136 at a non-zero angle (e.g., approximately 90-degrees) a second part of third portion I of first stringer surface 136 extends away from (e.g., is disposed relative to) the first part of third portion I of first stringer surface 136 at a non-zero angle (e.g., approximately 90-degrees).

As one example, one side of the rectangular cross-sectional shape of second crown 150 defines third portion II of second stringer surface 138. A first part of third portion II of second stringer surface 138 extends away from (e.g., is disposed relative to) second portion II of second stringer surface 138 at a non-zero angle (e.g., approximately 90-degrees) and a second part of third portion II of second stringer surface 138 extends away from (e.g., is disposed relative to) the first part of third portion II of second stringer surface 138 at a non-zero angle (e.g., approximately 90-degrees).

Referring generally to FIGS. 1 and 2, and particularly to, e.g., FIGS. 11 and 12, first crown 144 of the one of first stringers 106 and second crown 150 of the one of second stringers 108 each comprises a circular cross-sectional shape. The preceding subject matter of this paragraph characterizes example 24 of the present disclosure, wherein example 24 includes the subject matter of any of examples 20 or 21, above.

First crown 144 having a circular cross-sectional shape forms third portion I of first stringer surface 136 disposed in a plurality of planes and second crown 150 having a circular cross-sectional shape forms third portion II of second stringer surface 138 disposed in a plurality of planes to react to tension loads applied to first panel 102 and/or second panel 104.

As one example, one side of the circular cross-sectional shape of first crown 144 defines third portion I of first stringer surface 136. Third portion I of first stringer surface 136 extends away from second portion I of first stringer surface 136 in an arcuate manner.

As one example, one side of the circular cross-sectional shape of second crown 150 defines third portion II of second stringer surface 138. Third portion II of second stringer surface 138 extends away from second portion II of second stringer surface 138 in an arcuate manner.

Referring generally to FIGS. 1 and 2, and particularly to, e.g., FIGS. 11 and 12, first crown 144 of the one of first stringers 106 and second crown 150 of the one of second stringers 108 each comprises an oval cross-sectional shape. The preceding subject matter of this paragraph characterizes example 25 of the present disclosure, wherein example 25 includes the subject matter of any of examples 20 or 21, above.

First crown 144 having an ovular cross-sectional shape forms third portion I of first stringer surface 136 disposed in a plurality of planes and second crown 150 having an ovular cross-sectional shape forms third portion II of second stringer surface 138 disposed in a plurality of planes to react to tension loads applied to first panel 102 and/or second panel 104.

As one example, one side of the oval cross-sectional shape of first crown 144 defines third portion I of first stringer surface 136. Third portion I of first stringer surface 136 extends away from second portion I of first stringer surface 136 in an arcuate manner.

As one example, one side of the oval cross-sectional shape of second crown 150 defines third portion II of second stringer surface 138. Third portion II of second stringer surface 138 extends away from second portion II of second stringer surface 138 in an arcuate manner.

Referring generally to FIGS. 1 and 2, and particularly to, e.g., FIGS. 3-5, at least one of braces 200 is adhesively bonded to at least one of stringer pairs A of first stringers 106 and stringer pairs B of second stringers 108. The preceding subject matter of this paragraph characterizes example 26 of the present disclosure, wherein example 26 includes the subject matter of any of examples 2-25, above.

Adhesively bonding at least one of braces 200 to at least one of stringer pairs A of first stringers 106 and stringer pairs B of second stringers 108 constrains the at least one of braces 200 in a direction parallel to first stringers 106 and second stringers 108.

As one example, and as best illustrated in FIGS. 4, 8, 11 and 12, adhesive 236 is applied between each one of first interlocks 204 and each one of first stringers 106 of one of stringer pairs A of first stringers 106. Adhesive 236 is applied between each one of second interlocks 206 and each one of second stringers 108 of one of stringer pairs B of second stringers 108.

Referring generally to FIGS. 1 and 2, and particularly to, e.g., FIGS. 3-5, at least one of braces 200 is mechanically coupled to at least one of stringer pairs A of first stringers 106 and stringer pairs B of second stringers 108. The preceding subject matter of this paragraph characterizes example 27 of the present disclosure, wherein example 27 includes the subject matter of any of examples 2-26, above.

Mechanically coupling at least one of braces 200 to at least one of stringer pairs A of first stringers 106 and stringer pairs B of second stringers 108 constrains the at least one of braces 200 in a direction parallel to first stringers 106 and second stringers 108.

As one example, a mechanical coupling is connected between one of braces 200 and one of stringer pairs A of first stringers 106 and one of stringer pairs B of second stringers 108. As one example, the mechanical coupling is connected between each one of first interlocks 204 and each one of first stringers 106 of one of stringer pairs A of first stringers 106. Adhesive 236 is applied between each one of second interlocks 206 and each one of second stringers 108 of one of stringer pairs B of second stringers 108. As one example, the mechanical coupling is a fastener. As one example, the mechanical coupling is a clamp. As one example, the mechanical coupling is a clip. As one example, the mechanical coupling is a pin.

As one example, at least one of braces 200 is adhesively bonded and mechanically coupled to at least one of stringer pairs A of first stringers 106 and stringer pairs B of second stringers 108.

Referring, e.g., to FIGS. 1-4, brace 200 for geometrically interlocking stringer pairs A of first stringers 106, coupled to first panel 102, and stringer pairs B of second stringers 108, coupled to second panel 104, of structure 100, is disclosed. Brace 200 comprises chassis 202 comprising first interlocks 204 and second interlocks 206 opposite first interlocks 204. First interlocks 204 geometrically engage with one of stringer pairs A of first stringers 106 and second interlocks 206 geometrically engage with one of stringer pairs B of second stringers 108 to constrain brace 200 in all directions along plane 112 perpendicular to first stringers 106 and second stringers 108. The preceding subject matter of this paragraph characterizes example 28 of the present disclosure.

Geometrically interlocking stringer pairs A of first stringers 106 and stringer pairs B of second stringers with brace 200 significantly reduces, if not eliminates, the need to mechanically fasten brace 200 to first stringers 106 and/or second stringers 108 and/or brace 200 to first panel 102 and/or second panel 104 and, thus, significantly reduces the time, expense, complexity and/or difficulty in manufacturing (e.g., assembly of) structure 100.

As one example, and as best illustrated in FIG. 8, brace 200 (e.g., chassis 202 of brace 200) is solid. As one example, chassis 202 of brace 200 includes thickness T that is constant. As used herein "solid" refers to a three-dimensional body without openings or breaks.

As one example, and as best illustrated in FIG. 9, brace 200 (e.g., chassis 202 of brace 200) includes web 242 and flanges 244. As one example, flanges 244 are coupled to and extend outwardly, for example, perpendicularly, from web 242. As one example, flanges 244 are integral to and extend outwardly, for example, perpendicularly, from web 242. Web 242 interconnects flanges 244 and flanges 244 act as stiffening members for web 242.

As one example, exterior flanges 244 define surface 240 of brace 200 and, thus, thickness T of brace 200. As one example, exterior flanges 244 form first side 218, second side 220, first end 214 and second end 216 of brace 200. As one example, exterior flanges 244 form first interlocks 204, for example, an exterior surface of flanges 244 define first interlock surface 232 of first interlocks 204. As one example, exterior flanges 244 form second interlocks 206, for example, an exterior surface of flanges 244 define second interlock surface 234 of second interlocks 206.

Interior flanges 244 may include any configuration. As one example, interior flanges 244 are configured vertically. As one example, interior flanges 244 are configured horizontally. As one example, interior flanges 244 are crisscrossed. As one example, interior flanges 244 are configured in a truss formation.

As one example, and as best illustrated in FIG. 10, brace 200 (e.g., chassis 202 of brace 200) include structural members 246. Each one of structural members 246 is connected at an end thereof to another one of structural members 246. Brace 200 includes empty areas or material breaks between structural members 246.

As one example, exterior structural members 246 define surface 240 of brace 200 and, thus, thickness T of brace 200. As one example, exterior structural members 246 form first side 218, second side 220, first end 214 and second end 216 of brace 200. As one example, exterior flanges 244 form first interlocks 204, for example, an exterior surface of structural members 246 define first interlock surface 232 of first interlocks 204. As one example, exterior structural members 246 form second interlocks 206, for example, an exterior surface of structural members 246 244 define second interlock surface 234 of second interlocks 206.

Interior structural members 246 may include any configuration. As one example, interior structural members 246 are configured vertically. As one example, interior structural members 246 are configured horizontally. As one example, interior structural members 246 are crisscrossed. As one example, interior structural members 246 are configured in a truss formation.

The particular configuration of brace 200, for example, chassis 202 being solid, chassis 202 including web 242 and flanges 244, or chassis 202 including structural members 246 may be dictated by, for example, the materials used to fabricate brace 200, the manufacturing process used to fabricate brace 200, weight limitations of structure 100 and the like.

The manufacturing process used to fabricate brace 200 may depend upon the materials used to fabricate brace 200. As one example, brace 200 may be cast. As one example, brace 200 may be stamped. As one example, brace 200 may be molded. As one example, brace 200 may be machined. As one example, brace 200 may be welded. As one example, brace 200 may be additively manufactures.

Referring generally to FIG. 2, and particularly to, e.g., FIGS. 4 and 8-10, brace 200 further comprises first end 214 and second end 216, opposite first end 214. Brace 200 also comprises first side 218, extending between first end 214 and second end 214, and second side 220, extending between first end 214 and second end 214 opposite first side 218. Additionally, brace 200 comprises two first corners 222, adjacent first end 214, and two second corners 224, adjacent second end 216. A first one of first interlocks 204 is located at one of two first corners 222 of brace 200 and a second one of first interlocks 204 is located at another one of two first corners 222 of brace 200. A first one of second interlocks 206 is located at one of two second corners 224 of brace 200 and the second one of second interlocks 206 is located at another one of two second corners 224 of brace 200. The preceding subject matter of this paragraph characterizes example 29 of the present disclosure, wherein example 29 includes the subject matter of example 28, above.

First interlocks 204 being located at opposing two first corners 222 and second interlocks 206 being located at opposing two second corners 224 appropriately positions first interlocks 204 relative to one of stringer pairs A of first stringers 106 to geometrically engage the one of stringer pairs A of first stringers 106 and appropriately positions second interlocks 206 relative to one of stringer pairs B of second stringers 108, opposite the one of stringer pairs A, to geometrically engage the one of stringer pairs B of second stringers 108.

Referring generally to FIG. 2, and particularly to, e.g., FIGS. 4 and 8-10, brace 200 further comprises first brace flange 226 along first side 218 of brace 200. Brace 200 also comprises second brace flange 228 along second side 220 of brace 200. The preceding subject matter of this paragraph characterizes example 30 of the present disclosure, wherein example 30 includes the subject matter of example 29, above.

First brace flange 226 and second brace flange 228 enable joining (e.g., connection) of one brace 200 to another brace 200.

Referring generally to FIG. 2, and particularly to, e.g., FIGS. 8-10, brace 200 further comprises thickness T measured in thickness direction 230. First brace flange 226 and second brace flange 228 are offset from each other in thickness direction 230. The preceding subject matter of this paragraph characterizes example 31 of the present disclosure, wherein example 31 includes the subject matter of example 30, above.

First brace flange 226 and second brace flange 228 of brace 200 being offset enables one brace 200 and another brace 200 to be joined together along cooperating first brace flange 226 and second brace flange 228.

Referring generally to FIGS. 1 and 2, and particularly to, e.g., FIGS. 11 and 12 and FIGS. 4 and 8-10, one of first interlocks 204 comprises first interlock surface 232 at least partially defining a first interlock geometric shape and one of second interlocks 206 comprises second interlock surface 234 at least partially defining a second interlock geometric shape. First interlock surface 232 of the one of first interlocks 204 is configured to contact first stringer surface 136 of one of first stringers 106. First stringer surface 136 at least partially defines a first stringer geometric shape complementary to the first interlock geometric shape. Second interlock surface 234 of the one of second interlocks 206 is configured to contact second stringer surface 138 of one of second stringers 108. Second stringer surface 138 at least partially defines a second stringer geometric shape complementary to the second interlock geometric shape. The preceding subject matter of this paragraph characterizes example 32 of the present disclosure, wherein example 32 includes the subject matter of any of examples 28-31, above.

Contact between first interlock surface 232 of one of first interlocks 204 and first stringer surface 136 of one of first stringers 106 enables geometric engagement of the one first interlocks 204 with the one of first stringers 106 of one of stringer pairs A of first stringers 106 and contact between second interlock surface 234 of one of second interlocks 206 and second stringer surface 138 enables geometric engagement of the one second interlocks 206 with the one of second stringers 108 of one of stringer pairs B of second stringers 108.

Referring generally to FIG. 2, and particularly to, e.g., FIG. 8, brace 200 further comprises adhesive 236 applied to at least one of at least a portion of first interlock surface 232 of the one of first interlocks 204 and to at least a portion of second interlock surface 234 of the one of second interlocks 206. The preceding subject matter of this paragraph characterizes example 33 of the present disclosure, wherein example 33 includes the subject matter of example 32, above.

Adhesively bonding at least a portion of first interlock surface 232 of the one of first interlocks 204 to at least a portion of first stringer surface 136 of the one of first stringers 106 and adhesively bonding at least a portion of second interlock surface 234 of the one of second interlocks 206 to at least a portion of second stringer surface 138 of the one of second stringers 108 joins brace 200 to one of stringer pairs A of first stringers 106 and one of stringer pairs B of second stringers 108 and prevents movement, for example, in a direction parallel to one of first stringers 106 and one of second stringers 108.

As one example, and as best illustrated in FIG. 8, adhesive 236 is applied to a portion of surface 240 of brace 200, for example of chassis 202. As one example, adhesive 236 is applied to at least a portion of first interlock surface 232 of at least one of first interlocks 204 and is applied to at least a portion of second interlock surface 234 of at least one of second interlocks 206.

Referring generally to FIGS. 1-4, and particularly to, e.g., FIG. 13, method 500 for manufacturing structure 100 is disclosed. Structure 100 comprises first panel 102 and second panel 104. Referring to Block 502 of FIG. 13, method 500 comprises interconnecting first panel 102 and second panel 104 by geometrically interlocking stringer pairs A of first stringers 106, coupled to first panel 102, with stringer pairs B of second stringers 108, coupled to second panel 104, in all directions along plane 112 perpendicular to first stringers 106 and second stringers 108. The preceding subject matter of this paragraph characterizes example 34 of the present disclosure.

Geometrically interlocking stringer pairs A of first stringers 106 and stringer pairs B of second stringers significantly reduces, if not eliminates, the need for mechanical fasteners and, thus, significantly reduces the time, expense, complexity and/or difficulty in manufacturing (e.g., assembly of) structure 100.

Referring generally to FIGS. 1-4, and particularly to, e.g., FIG. 13 (Block 504), method 500 further comprises geometrically interlocking braces 200 with stringer pairs A of first stringers 106 and stringer pairs B of second stringers 108. The preceding subject matter of this paragraph characterizes example 35 of the present disclosure, wherein example 35 includes the subject matter of example 34, above.

Geometrically interlocking stringer pairs A of first stringers 106 and stringer pairs B of second stringers with braces 200 significantly reduces, if not eliminates, the need to mechanically fasten braces 200 to first stringers 106 and/or second stringers 108 and/or braces 200 to first panel 102 and/or second panel 104 and, thus, significantly reduces the time, expense, complexity and/or difficulty in manufacturing (e.g., assembly of) structure 100.

Referring generally to FIGS. 4, 7 and 8-12, and particularly to, e.g., FIG. 13 (Block 506), method 500 further comprises geometrically engaging first interlocks 204 of each of braces 200 with one of stringer pairs A of first stringers 106 and geometrically engaging second interlocks 206 of each of braces 200 with one of stringer pairs B of second stringers 108. The preceding subject matter of this paragraph characterizes example 36 of the present disclosure, wherein example 36 includes the subject matter of example 35, above.

Geometrically engaging first interlocks 204 of each of braces 200 with one of stringer pairs A of first stringers 106 and geometrically engaging second interlocks 206 of each of braces 200 with one of stringer pairs B of second stringers 108 constrains each of braces 200 in all directions along plane 112 without the need to fasten each of braces 200 to first stringers 106 and/or second stringers 108.

As one example, and as best illustrated in FIGS. 14 and 15, one of braces 200 is installed through one of first side 118 or second side 120 of structure 100. As one example, one of braces 200 is inserted through an opening defined between first panel 102 and second panel 104 along first side 118 or an opening defined between first panel 102 and second panel 104 along second side 120.

Second panel 104 and second stringers 106 (e.g., stringer pairs B of second stringers 108) are not illustrated in FIGS. 14 and 15 for purposed of clarity. It is understood that structure 100 illustrated in FIGS. 14 and 15 includes second panel 104 and second stringers 106 (e.g., stringer pairs B of second stringers 108).

As one example, one of braces 200 is positioned between one of stringer pairs A of first stringers 106 and one of stringer pairs B of second stringers 108 opposite the one of stringer pairs A of first stringers 106. As one example, the one of braces 200 is positioned centrally between the one of stringer pairs A of first stringers 106 and the one of stringer pairs B of second stringers 108 opposite the one of stringer pairs A of first stringers 106.

As one example, the one of braces 200 is initially positioned generally parallel to first stringers 106 and second stringers 108. The one of braces 200 is rotated (e.g., twisted) about a central longitudinal axis A (FIG. 8) to geometrically engage first interlocks 204 of the one of braces 200 with the one of stringer pairs A of first stringers 106 and geometrically engage second interlocks 206 of the one of braces 200 with the one of stringer pairs B of second stringers 108 in order to geometrically interlock the one of braces 200 with the one of stringer pairs A of first stringers 106 and the one of stringer pairs B of second stringers 108, as best illustrated in FIG. 4.

Referring generally to FIGS. 1, 2, 4 and 5, and particularly to, e.g., FIG. 13 (Block 508), method 500 further comprises geometrically interlocking each of braces 200 with one of stringer pairs A of first stringers 106 and one of stringer pairs B of second stringers 108 to form rows 208 of braces 200. The preceding subject matter of this paragraph characterizes example 37 of the present disclosure, wherein example 37 includes the subject matter of any of examples 35 or 36, above.

Geometrically interlocking a plurality of first stringers 106 (e.g., a plurality of stringer pairs A) and a plurality of second stringers 108 (e.g., a plurality of stringer pairs B) with row 208 of braces 200 reduces the time, expense, complexity and/or difficulty in manufacturing (e.g., assembly of) structure 100.

As one example, structure 100 includes stations 170. Each of stations 170 is defined by one of stringer pairs A of first stringers 106 and one of stringer pairs B of second stringers 108 opposite the one of stringer pairs A of first stringers 106. As one example, the one of braces 200 (e.g., a first one of braces 200 of row 208 of braces 200) is installed at one of stations 170 disposed proximate a lateral center (e.g., in lateral direction 124) of structure 100. The one of braces 200 may be installed at any longitudinal position (e.g., in longitudinal direction 122) of structure, for example, proximate first end 114, proximate second end 116, proximate a longitudinal center or any position therebetween.

Another one of braces 200 is installed through one of first side 118 or second side 120. The another one of braces 200 is installed at another one of stations 170 laterally adjacent to the one of stations 170 such that the another one of braces 200 is laterally adjacent to the one of braces 200.

As one example, and as best illustrated in FIG. 15, another one of braces 200 is installed through one of first side 118 or second side 120 of structure 100. As one example, the another one of braces 200 is inserted through an opening defined between first panel 102 and second panel 104 along first side 118 or an opening defined between first panel 102 and second panel 104 along second side 120.

As one example, the another one of braces 200 is positioned between another one of stringer pairs A of first stringers 106 and another one of stringer pairs B of second stringers 108 opposite the one of stringer pairs A of first stringers 106, for example, defining another one of stations 170. As one example, the another one of braces 200 is positioned centrally between the another one of stringer pairs A of first stringers 106 and the another one of stringer pairs B of second stringers 108 opposite the another one of stringer pairs A of first stringers 106.

As one example, the another one of braces 200 is initially positioned generally parallel to first stringers 106 and second stringers 108. The another one of braces 200 is rotated (e.g., twisted) about the central longitudinal axis A (FIG. 8) to geometrically engage first interlocks 204 of the another one of braces 200 with the another one of stringer pairs A of first stringers 106 and geometrically engage second interlocks 206 of the another one of braces 200 with the another one of stringer pairs B of second stringers 108 in order to geometrically interlock the another one of braces 200 with the another one of stringer pairs A of first stringers 106 and the another one of stringer pairs B of second stringers 108, as best illustrated in FIG. 5.

As one example, structure 100 includes a constant cross-sectional, for example, in at least one of longitudinal direction 122 and/or lateral direction 124. In such an example, when structure 100 includes a constant longitudinal cross-section, each one of braces 200 positioned at any longitudinal position (e.g., the same one of stations 170 in longitudinal direction 122) may have the same size and/or shape. In such an example, when structure 100 includes a constant lateral cross-section, each one of braces 200 positioned at any lateral position (e.g., each one of stations 170 in lateral direction 124) may have the same size and/or shape. In such an example, when structure 100 includes a constant longitudinal cross-section and a constant lateral cross-section, each one of braces 200 positioned at any longitudinal position and at any lateral position may have the same size and/or shape.

As one example, structure 100 includes a variable cross-section, for example, in at least one of longitudinal direction 122 and/or lateral direction 124. As one example, the wing of an aircraft may include a variable cross-section (e.g., a curvature) in at least one of the chordwise and/or the spanwise direction. In such an example, when structure 100 includes a variable longitudinal cross-section, each one of braces 200 positioned at any longitudinal position (e.g., the same one of stations 170 in longitudinal direction 122) may have a different size and/or shape. In such an example, when structure 100 includes a variable lateral cross-section, each one of braces 200 positioned at any lateral position (e.g., each one of stations 170 in lateral direction 124) may have to different size and/or shape. In such an example, when structure 100 includes a variable longitudinal cross-section and a variable lateral cross-section, each one of braces 200 positioned at any longitudinal position and at any lateral position may have a different size and/or shape. Thus, in such an example, each one of braces 200 includes an appropriate (e.g., unique) size and/or shape associated with a particular longitudinal and/or lateral location.

Referring generally to FIGS. 1, 2, 4, and 5 and particularly to, e.g., FIG. 13 (Block 510), method 500 further comprises extending one of rows 208 of braces 200 in lateral direction 124 between first side 118 and second side 120 of structure 100. The preceding subject matter of this paragraph characterizes example 38 of the present disclosure, wherein example 38 includes the subject matter of example 37, above.

Extending one of rows 208 of braces 200 in lateral direction 124 appropriately positions and maintains first panel 102 relative to second panel 104 along lateral direction.

As one example, additional one of braces 200 are installed through one of first side 118 or second side 120. The additional ones of braces 200 are installed at other ones of stations 170 laterally adjacent to the ones of stations 170 in which one of braces 200 have already been installed. As one example, installation of braces 200 begins centrally and additional braces 200 are installed extending outward in lateral direction 124 toward first side 118 and second side 120.

As one example, installation of braces 200, for example, inserting braces 200 between first panel 102 and second panel 104, positioning braces 200 between stringer pairs A of first stringers 106 and stringer pairs B of second stringers 108, and rotating braces 200 to geometrically interlock braces 200 with stringer pairs A of first stringers 106 and stringer pairs B of second stringers 108 is performed by an automated system (not illustrated). As one example, the automated system is a robot. The robot may include an end effector configured to grasp each one of braces 200, move each one of braces 200, position each one of braces 200 and/or rotated each one of braces 200 in order to geometrically interlock each one of braces 200 with stringer pairs A of first stringers 106 and stringer pairs B of second stringers 108.

Referring generally to FIGS. 1, 2, 4, and 5 and particularly to, e.g., FIG. 13 (Block 512), method 500 further comprises coupling one of braces 200 of one of rows 208 of braces 200 to another one of braces 200 of the one of rows 208 of braces 200. The preceding subject matter of this paragraph characterizes example 39 of the present disclosure, wherein example 39 includes the subject matter of any of examples 37 or 38, above.

Coupling one of braces 200 of row 208 of braces 200 to another one of braces 200 of row 208 of braces 200 secures the one of braces 200 of row 208 of braces 200 to prevent movement of the one of braces 200 of row 208 of braces 200 relative to the another one of braces 200 of row 208 of braces 200.

As one example, the automated system, for example, a robot, couples each one of braces 200 of row 208 of braces 200 to another one of braces 200 of row 208 of braces 200.

As one example, the robot includes an end effector configured to locate and machine (e.g., drill) fastening holes through first brace flange 226 and second brace flange 228 of each of braces 200 and install fasteners through the fastener holes to mechanically couple one of braces 200 of row 208 of braces 200 to another one of braces 200 of row 208 of braces 200.

As one example, the robot includes an end effector configured to apply adhesive 134 to first brace flange 226 and second brace flange 228 of each of braces 200 to adhesively bond one of braces 200 of row 208 of braces 200 to another one of braces 200 of row 208 of braces 200. As one example, the robot includes an end effector configured to cure adhesive 134.

As one example, the robot includes an end effector configured to weld first brace flange 226 and second brace flange 228 of each of braces 200 to rigidly join one of braces 200 of row 208 of braces 200 to another one of braces 200 of row 208 of braces 200. As one example, the robot includes an end effector configured to cure adhesive 134.

Referring generally to FIGS. 1-5 and 7, and particularly to, e.g., FIG. 13 (Blocks 514), method 500 further comprises coupling first spar 126 to first panel 102 and to second panel 104 along first side 118 of structure 100. Method 500 also comprises coupling second spar 128 to first panel 102 and to second panel 104 along second side 120 of structure 100. Additionally, method 500 comprises coupling each of rows 208 of braces 200 to first spar 126 and second spar 128. The preceding subject matter of this paragraph characterizes example 40 of the present disclosure, wherein example 40 includes the subject matter of any of examples 37-40, above.

Coupling first spar 126 and second spar 128 to first panel 102 and second panel 104 encloses structure 100, for example, along first side 118 and second side 120 of structure 100, respectively, and adds rigidity to structure 100. Coupling row 208 of braces 200 to first spar 126 and second spar 128 prevents movement of row 208 of braces 200 and adds rigidity and load bearing capabilities to structure 100.

As one example, coupling first spar 126 and second spar 128 to first panel 102 and second panel 104 is performed after all of braces 200 have been geometrically interlocked with stringer pairs A of first stringers 106 and stringer pairs B of second stringers 108, any braces 200 have been coupled to other braces 200, any rows 208 of braces 200 have been installed, array 212 of rows 208 of braces 200 have been installed, and/or hermetic seal 134 has been formed.

Referring generally to FIGS. 1-3, 5 and 7, and particularly to, e.g., FIG. 13 (Blocks 516), method 500 further comprises coupling a first one of two end braces 210 to one of braces 200 of one of rows 208 of braces 200. Method 500 also comprises coupling a second one of two end braces 210 to another one of braces 200 of the one of rows 208 of braces 200. Additionally, method 500 comprises coupling the first one of two end braces 210 to first spar 126 and coupling the second one of two end braces 210 to second spar 128. The preceding subject matter of this paragraph characterizes example 41 of the present disclosure, wherein example 41 includes the subject matter of example 40, above.

Coupling one of two end braces 210 between row 208 of braces 200 and each one of first spar 126 and second spar 128 interconnects row 208 of braces 200 and first spar 126 and second spar 128 to prevent movement of row 208 of braces 200 and add rigidity and load bearing capabilities to structure 100.

As one example, coupling each one of two end braces 210 to one of braces 200 of one of rows 208 of braces 200 is performed prior to coupling first spar 126 and second spar 128 to first panel 102 and second panel 104. As one example, coupling one of two end braces 210 to first spar 126 and coupling another one of two end braces 210 to second spar 128 is performed after coupling first spar 126 and second spar 128 to first panel 102 and second panel 104. As one example, first spar 126 includes first access openings 172 and second spar 128 includes second access openings 174, as best illustrated in FIG. 3. As one example, first access openings 172 are disposed through wall portion 152 of first spar 126 proximate first spar flanges 130 and second access openings 174 are disposed through wall portion 152 of second spar 128 proximate second spar flanges 132. First access openings 172 and second access openings 174 are configured (e.g., suitably sized and/or shaped) to provide access for coupling each of two end braces 210 to first spar 126 and second spar 128. As one example, the robot with a suitable end effector is inserted through one of first access openings 172 or one of second access openings 174 to couple one of two end braces 210 to one of first spar flanges 130 or one of second spar flanges 132.

Referring generally to FIGS. 1, 2 and 4-7, and particularly to, e.g., FIG. 13 (Block 518), method 500 further comprises arranging rows 208 of braces 200 in array 212 extending in longitudinal direction 122 between first end 114 and second end 116 of structure 100. The preceding subject matter of this paragraph characterizes example 42 of the present disclosure, wherein example 42 includes the subject matter of any of examples 40 or 41, above.

Arranging rows 208 of braces 200 in array extending in longitudinal direction 122 appropriately positions and maintains first panel 102 relative to second panel 104 along longitudinal direction.

Referring generally to FIGS. 1, 2 and 5, and particularly to, e.g., FIG. 13 (Block 520), method 500 further comprises applying hermetic seal 134 between two of rows 208 of braces 200 and first panel 102, second panel 104, first stringers 106, second stringers 108, first spar 126, and second spar 128. The preceding subject matter of this paragraph characterizes example 43 of the present disclosure, wherein example 43 includes the subject matter of example 42, above.

Applying hermetic seal 134 between at least two of rows 208 of braces 200 and first panel 102, second panel 104, first stringers 106, second stringers 108, first spar 126, and second spar 128 tightly closes and unites the at least two of rows 208 of braces 200 and first panel 102, second panel 104, first stringers 106, second stringers 108, first spar 126, and second spar 128.

Referring generally to FIGS. 1, 2 and 5, and particularly to, e.g., FIG. 13 (Block 522), method 500 further comprises applying hermetic seal 134 between braces 200 of the two of rows 208 of braces 200. The preceding subject matter of this paragraph characterizes example 44 of the present disclosure, wherein example 44 includes the subject matter of example 43, above.

Applying hermetic seal 134 between braces 200 of at least two of rows 208 of braces 200 tightly closes and unites braces 200 of the at least two of rows 208 of braces 200.

As one example, the automated system, for example, a robot, is configured to apply hermetic seal 134 between at least two of rows 208 of braces 200 and first panel 102, second panel 104, first stringers 106, second stringers 108, first spar 126, and second spar 128 and/or between braces 200 of at least two of rows 208 of braces 200, for example, to form sealed compartment 168 (FIG. 6).

Referring generally to FIGS. 1-5, 7, 11, and 12, and particularly to, e.g., FIG. 13 (Block 524), method 500 further comprises adhesively bonding one of braces 200 to one of stringer pairs A of first stringers 106 and to one of stringer pairs B of second stringers 108. The preceding subject matter of this paragraph characterizes example 45 of the present disclosure, wherein example 45 includes the subject matter of any of examples 35-44, above.

Adhesively bonding at least one of braces 200 to at least one of stringer pairs A of first stringers 106 and stringer pairs B of second stringers 108 constrains the at least one of braces 200 in a direction parallel to first stringers 106 and second stringers 108.

As one example, the automated system, for example, a robot, is configured to adhesively bond at least one of braces 200 to at least one of stringer pairs A of first stringers 106 and stringer pairs B of second stringers 108.

Referring generally to FIGS. 1-5, 7, 11 and 12, and particularly to, e.g., FIG. 13 (Block 526), method 500 further comprises mechanically coupling one of braces 200 to one of stringer pairs A of first stringers 106 and to one of stringer pairs B of second stringers 108. The preceding subject matter of this paragraph characterizes example 46 of the present disclosure, wherein example 46 includes the subject matter of any of examples 35-45, above.

Mechanically coupling at least one of braces 200 to at least one of stringer pairs A of first stringers 106 and stringer pairs B of second stringers 108 constrains the at least one of braces 200 in a direction parallel to first stringers 106 and second stringers 108.

As one example, the automated system, for example, a robot, is configured to mechanically couple at least one of braces 200 to at least one of stringer pairs A of first stringers 106 and stringer pairs B of second stringers 108.

Examples of the present disclosure may be described in the context of aircraft manufacturing and service method 1100 as shown in FIG. 16 and aircraft 1102 as shown in FIG. 17. During pre-production, illustrative method 1100 may include specification and design block 1104 of aircraft 1102 and material procurement block 1106. During production, component and subassembly manufacturing block 1108 and system integration block 1110 of aircraft 1102 may take place. Thereafter, aircraft 1102 may go through certification and delivery block 1112 to be placed in service block 1114. While in service, aircraft 1102 may be scheduled for routine maintenance and service block 1116. Routine maintenance and service may include modification, reconfiguration, refurbishment, etc. of one or more systems of aircraft 1102.

Each of the processes of illustrative method 1100 may be performed or carried out by a system integrator, a third party, and/or an operator e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry, the marine industry, the construction industry, civil engineering or military applications and the like. Accordingly, in addition to aircraft 1102, the principles disclosed herein may apply to other vehicles, e.g., land vehicles, marine vehicles, space vehicles, etc. or other structures, e.g., prefabricated enclosures, temporary bridges, etc.

Apparatuses and methods shown or described herein may be employed during any one or more of the stages of the manufacturing and service method 1100. For example, components or subassemblies corresponding to component and subassembly manufacturing block 1108 may be fabricated or manufactured in a manner similar to components or subassemblies produced while aircraft 1102 is in service block 1114. Also, one or more examples of the apparatuses, methods, or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service block 1114 and/or during maintenance and service block 1116.

Different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated draw-

What is claimed is:

1. A structure (100) comprising:
a first panel (102);
first stringers (106), coupled to the first panel (102) and comprising stringer pairs A;
a second panel (104) opposite the first panel (102);
second stringers (108), coupled to the second panel (104) and opposite the first stringers (106), wherein the second stringers (108) comprise stringer pairs B;
a first end (114) and a second end (116), opposed to the first end (114);
a first side (118) and a second side (120), opposed to the first side (118), wherein the first stringers (106) and the second stringers (108) extend in a longitudinal direction (122) between the first end (114) and the second end (116); and
braces (200), wherein each of the braces (200) is geometrically interlocked with one of the stringer pairs A of the first stringers (106) and one of the stringer pairs B of the second stringers (108) in all directions along a plane (112) perpendicular to the first stringers (106) and the second stringers (108), and wherein:
the braces (200) comprise rows (208) of the braces (200), and
each of the rows (208) of the braces (200) extends in a lateral direction (124) between the first side (118) and the second side (120).

2. The structure (100) of claim 1, wherein each of the braces (200) comprises:
a chassis (202) comprising first interlocks (204) and second interlocks (206) opposite the first interlocks (204),
wherein the first interlocks (204) are geometrically engaged with one of the stringer pairs A of the first stringers (106) and the second interlocks (206) are geometrically engaged with one of the stringer pairs B of the second stringers (108).

3. The structure (100) of claim 2, wherein:
each of the braces (200) further comprises:
a first end (214) and a second end (216) opposite the first end (214);
a first side (218) extending between the first end (214) and the second end (214) and a second side (220) extending between the first end (214) and the second end (214) opposite the first side (218);
two first corners (222) adjacent the first end (214); and
two second corners (224) adjacent the second end (216);
a first one of the first interlocks (204) is located at one of the two first corners (222) of each of the braces (200) and a second one of the first interlocks (204) is located at another one of the two first corners (222) of each of the braces (200); and
a first one of the second interlocks (206) is located at one of the two second corners (224) of each of the braces (200) and the second one of the second interlocks (206) is located at another one of the two second corners (224) of each of the braces (200).

4. The structure (100) of claim 3, wherein each of the braces (200) further comprises:
a first brace flange (226) along the first side (218) of each of the braces (200); and
a second brace flange (228) along the second side (220) of each of the braces (200),
wherein the first brace flange (226) of one of the braces (200) is joined to the second brace flange (228) of another one of the braces (200).

5. The structure (100) of claim 2, wherein:
one of the first interlocks (204) comprises a first interlock surface (232) at least partially defining a first interlock geometric shape and one of the second interlocks (206) comprises a second interlock surface (234) at least partially defining a second interlock geometric shape,
one of the first stringers (106) comprises a first stringer surface (136) at least partially defining a first stringer geometric shape complementary to the first interlock geometric shape and one of the second stringers (108) comprises a second stringer surface (138) at least partially defining a second stringer geometric shape complementary to the second interlock geometric shape,
the first interlock surface (232) of the one of the first interlocks (204) contacts the first stringer surface (136) of the one of the first stringers (106), and
the second interlock surface (234) of the one of the second interlocks (206) contacts the second stringer surface (138) of the one of the second stringers (108).

6. The structure (100) of claim 5, wherein:
at least a portion of the first interlock surface (232) of the one of the first interlocks (204) is adhesively bonded to at least a portion of the first stringer surface (136) of the one of the first stringers (106), and
at least a portion of the second interlock surface (234) of the one of the second interlocks (206) is adhesively bonded to at least a portion of the second stringer surface (138) of the one of the second stringers (108).

7. The structure (100) of claim 5, wherein:
the one of the first stringers (106) comprises:
a first foot (140) defining a first portion I of the first stringer surface (136);
a first web (142) projecting from the first foot (140) and defining a second portion I of the first stringer surface (136); and
a first crown (144) located at an end of the first web (142) and defining a third portion I of the first stringer surface (136); and
the one of the second stringers (108) comprises:
a second foot (146) defining a first portion II of the second stringer surface (138);
a second web (148) projecting from the second foot (146) and defining a second portion II of the second stringer surface (138); and
a second crown (150) located at an end of the second web (148) and defining a third portion II of the second stringer surface (138).

8. The structure (100) of claim 2, wherein at least one of the braces (200) is adhesively bonded to at least one of the stringer pairs A of the first stringers (106) and the stringer pairs B of the second stringers (108).

9. The structure (100) of claim 1,
the rows (208) are arranged in an array (212) extending in the longitudinal direction (122) between the first end (114) and the second end (116), and each of the rows (208) of the braces (200) comprises at least one of the braces (200).

10. The structure (100) of claim 1, wherein one of the braces (200) of each of the rows (208) of the braces (200) is coupled to another one of the braces (200) laterally adjacent to the at least one of the braces (200).

11. The structure (100) of claim 1, further comprising:
a first spar (126) coupled to the first panel (102) and the second panel (104) along the first side (118) of the structure (100); and
a second spar (128) coupled to the first panel (102) and the second panel (104) along the second side (120) of the structure (100),
wherein each of the rows (208) of the braces (200) is coupled to the first spar (126) and the second spar (128).

12. The structure (100) of claim 11 further comprising two end braces (210), wherein:
one of the two end braces (210) is coupled to one of the braces (200) of one of the rows (208) of the braces (200) and another one of the two end braces (210) is coupled to another one of the braces (200) of the one of the rows (208), and
a first one of the two end braces (210) is coupled to the first spar (126) and a second one of the two end braces (210) is coupled to the second spar (128).

13. The structure (100) of claim 12, wherein:
the first spar (126) comprises first spar flanges (130) and the second spar (128) comprises second spar flanges (132), and
the first one of the two end braces (210) is joined to one of the first spar flanges (130) of the first spar (126) and the second one of the two end braces (210) is joined to one of the second spar flanges (132) of the second spar (128).

14. The structure (100) of claim 1,
wherein each of the rows (208) of the braces (200) comprises at least two of the braces (200).

15. A method (500) for manufacturing a structure (100) comprising a first panel (102) and a second panel (104), the method (500) comprising:

interconnecting the first panel (102) and the second panel (104) by geometrically interlocking stringer pairs A of first stringers (106), coupled to the first panel (102), with stringer pairs B of second stringers (108), coupled to the second panel (104), in all directions along a plane (112) perpendicular to the first stringers (106) and the second stringers (108); and geometrically interlocking each one of braces (200) with one of the stringer pairs A of the first stringers (106) and one of the stringer pairs B of the second stringers (108) to form rows (208) of the braces (200).

16. The method (500) of claim 15, further comprising arranging the rows (208) of the braces (200) in an array (212), extending in a longitudinal direction (122) between a first end (114) and a second end (116) of the structure (100).

17. The method (500) of claim 15, further comprising geometrically engaging first interlocks (204) of each of the braces (200) with one of the stringer pairs A of the first stringers (106) and geometrically engaging second interlocks (206) of each of the braces (200) with one of the stringer pairs B of the second stringers (108).

18. The method (500) of claim 15, wherein each of the rows (208) of the braces (200) comprises at least two of the braces (200).

19. The method (500) of claim 15, further comprising coupling one of the braces (200) of one of the rows (208) of the braces (200) to another one of the braces (200) of the one of the rows (208) of the braces (200).

20. The method (500) of claim 15, further comprising:
coupling a first spar (126) to the first panel (102) and to the second panel (104) along a first side (118) of the structure (100);
coupling a second spar (128) to the first panel (102) and to the second panel (104) along a second side (120) of the structure (100); and
coupling each of the rows (208) of the braces (200) to the first spar (126) and the second spar (128).

* * * * *